United States Patent
Faruque et al.

(10) Patent No.: US 12,403,820 B2
(45) Date of Patent: Sep. 2, 2025

(54) VEHICLE PROXIMITY NOTIFICATION

(71) Applicant: TORC Robotics, Inc., Blacksburg, VA (US)

(72) Inventors: Ruel Faruque, Blacksburg, VA (US); Andre Scholich, Leipzig (DE)

(73) Assignee: Torc Robotics, Inc., Blacksburg, VA (US)

( * ) Notice: Subject to any disclaimer, the term of this patent is extended or adjusted under 35 U.S.C. 154(b) by 197 days.

(21) Appl. No.: 18/334,984

(22) Filed: Jun. 14, 2023

(65) Prior Publication Data

US 2024/0416829 A1 Dec. 19, 2024

(51) Int. Cl.
*B60Q 1/50* (2006.01)
*B60Q 1/54* (2006.01)
*B60Q 5/00* (2006.01)

(52) U.S. Cl.
CPC .............. *B60Q 1/525* (2013.01); *B60Q 1/54* (2013.01); *B60Q 5/006* (2013.01); *B60Q 2400/20* (2013.01)

(58) Field of Classification Search
CPC .......... B60Q 1/525; B60Q 1/54; B60Q 5/006; B60Q 2400/20; B60Q 9/008; B60Q 2400/50
See application file for complete search history.

(56) References Cited

U.S. PATENT DOCUMENTS

| | | | |
|---|---|---|---|
| 2020/0247434 A1* | 8/2020 | Kim | G08G 1/166 |
| 2020/0369293 A1* | 11/2020 | Jeon | B60W 40/08 |
| 2021/0394793 A1* | 12/2021 | Austin | G08G 1/0112 |
| 2023/0303117 A1* | 9/2023 | Schneemann | B60W 50/0097 |
| 2024/0054822 A1* | 2/2024 | Alfonsetti | G07C 5/008 |
| 2024/0062656 A1* | 2/2024 | Forscher | G08G 1/163 |
| 2024/0157936 A1* | 5/2024 | Watkins | B60W 30/0956 |
| 2024/0214786 A1* | 6/2024 | Sharma Banjade | H04W 4/023 |

* cited by examiner

*Primary Examiner* — Daryl C Pope
(74) *Attorney, Agent, or Firm* — Armstrong Teasdale LLP

(57) ABSTRACT

Aspects of this technical solution can include generating, by one or more processors coupled to non-transitory memory, a metric based on one or more of a first aspect of a first trajectory of a vehicle and a second aspect of a second trajectory of an object in a field of view of the vehicle, identifying, by the one or more processors, an audiovisual device of the vehicle located at a portion of an exterior of the vehicle corresponding to the field of view, the audiovisual device configured to output an indication from the portion of the exterior of the vehicle, and actuating, by the one or more processors, the audiovisual device to output the indication having a property based on the metric.

20 Claims, 13 Drawing Sheets

VEHICLE PROXIMITY NOTIFICATION

TECHNICAL FIELD

The present implementations relate generally to systems and methods for vehicle signaling, including but not limited to vehicle proximity notifications.

BACKGROUND

Conventional motor vehicles have limited means for communication. Honking a vehicle's horn can mean any number of things, resulting in a lack of effective communication. This issue is further accentuated in larger vehicles. The larger the vehicle, the less clear the meaning of a honk becomes. A driver of a sedan may honk the sedan's horn to warn a fellow driver that they are following the sedan too closely, but such a message is unlikely to be conveyed by honking the horn of a large tractor-trailer.

SUMMARY

This technical solution is directed at least to systems and methods for vehicle proximity notification. For example, this technical solution can include one or more indicators on an exterior of a vehicle, to alert external vehicles. The indicators can output various audiovisual indications, for example, that communicate to an exterior vehicle based on absolute or relative trajectories of the vehicle. Thus, a technical solution for vehicle proximity notifications is provided. This technical solution can provide at least the technical improvement of responsive communication to one or more vehicles at a frequency corresponding to traffic movement up to and including highway speeds. For example, this technical solution can provide a technical improvement of detection to and reaction by a vehicle to one or a plurality of vehicles external to that vehicle, beyond the capability of a manual process to detect and process concurrently in a compressed time frame corresponding to fractions of a second as required for effective steering and navigation of motor vehicles.

At least one aspect is directed to a method. The method can include generating, by one or more processors coupled to non-transitory memory, a metric based on one or more of a first aspect of a first trajectory of a vehicle and a second aspect of a second trajectory of an object in a field of view of the vehicle. The method can include identifying, by the one or more processors, an audiovisual device of the vehicle located at a portion of an exterior of the vehicle corresponding to the field of view, the audiovisual device configured to output an indication from the portion of the exterior of the vehicle. The method can include actuating, by the one or more processors, the audiovisual device to output the indication having a property based on the metric.

At least one aspect is directed to a system. The system can include one or more processors coupled to non-transitory memory, and an audiovisual device. The system can generate a metric based on one or more of a first aspect of a first trajectory of a vehicle and a second aspect of a second trajectory of an object in a field of view of the vehicle. The system can identify the audiovisual device of the vehicle located at a portion of an exterior of the vehicle corresponding to the field of view, the audiovisual device configured to output an indication from the portion of the exterior of the vehicle. The system can actuate the audiovisual device to output the indication having a property based on the metric.

At least one aspect is directed to a non-transitory computer readable medium that can include one or more instructions stored thereon and executable by a processor. The processor can generate a metric based on one or more of a first aspect of a first trajectory of a vehicle and a second aspect of a second trajectory of an object in a field of view of the vehicle. The processor can identify the audiovisual device of the vehicle located at a portion of an exterior of the vehicle corresponding to the field of view, the audiovisual device configured to output an indication from the portion of the exterior of the vehicle. The processor can actuate the audiovisual device to output the indication having a property based on the metric.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Figure 1:
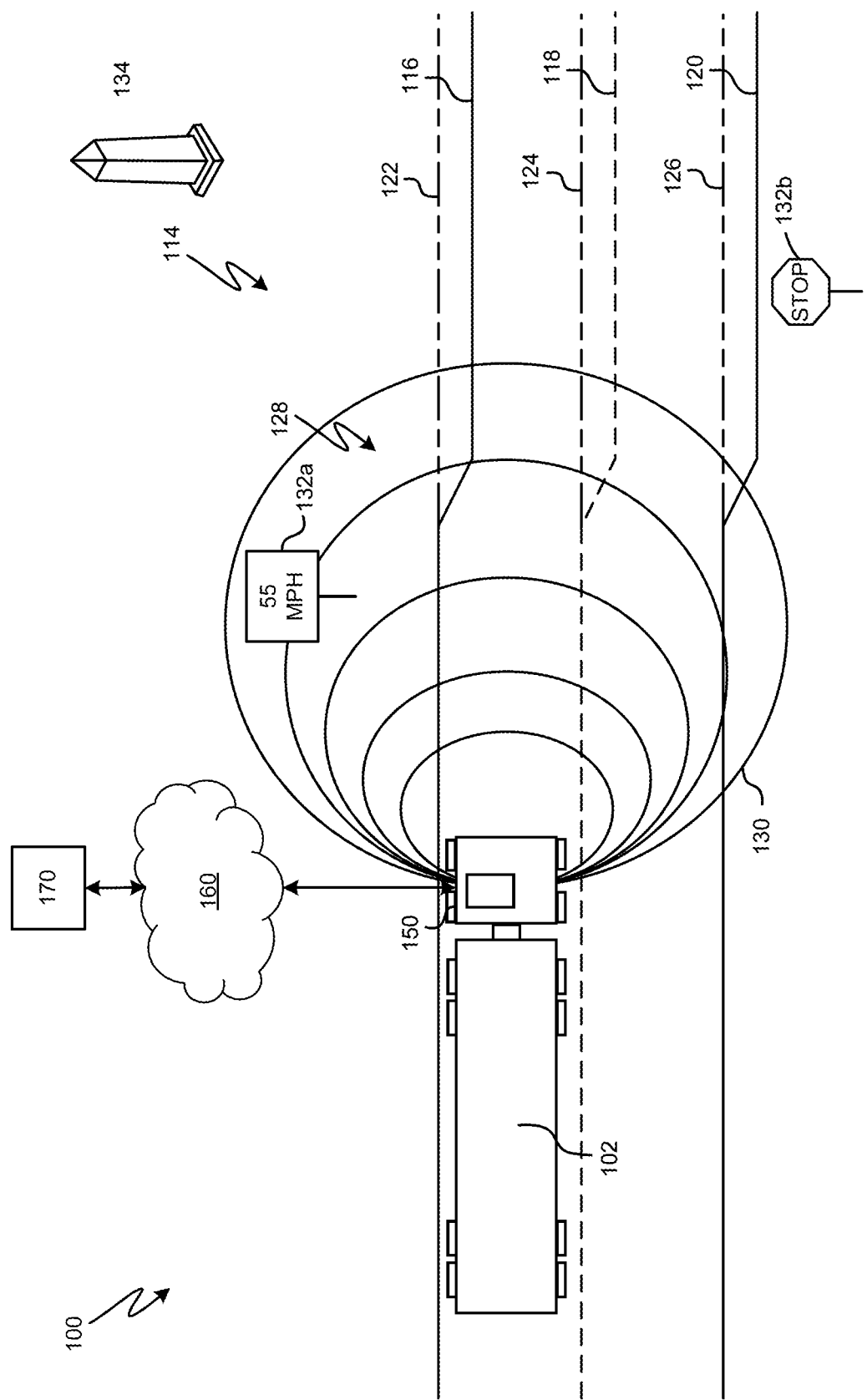
FIG. 1 is a bird's eye view of a roadway including a schematic representation of a vehicle and aspects of an autonomy system of the vehicle, according to an embodiment.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Aspects discussed herein provide for calculation of a vehicle trajectory and an external vehicle trajectory, generation of a metric based on the vehicle trajectory and the external trajectory, comparison of the metric to one or more thresholds, and emission of an audiovisual indication based on the metric.

One or more sensors of the vehicle can be used to determine the vehicle trajectory, where the vehicle trajectory includes a position, velocity, acceleration, and jerk of the vehicle. One or more sensors of the vehicle can be used to determine the external vehicle trajectory, where the external vehicle trajectory includes a position, velocity, acceleration, and jerk of the external vehicle. A machine learning architecture of the vehicle can be used to determine the vehicle and external vehicle trajectories based on sensor measurements. The machine learning architecture can be used to generate a metric based on the vehicle and external vehicle trajectories. The metric can include, or be compared to, one or more thresholds. The thresholds can be based on vehicle sensor fields of view, vehicle sensor ranges, and/or any aspect of the vehicle and external vehicle trajectories.

The technical solution can include determining a vehicle trajectory and an external vehicle trajectory. The vehicle trajectory and external vehicle trajectory can each include position, velocity, acceleration, and jerk. The technical solution can include generating a metric based on the vehicle trajectory and the external vehicle trajectory. The metric can include whether certain thresholds are satisfied by the vehicle trajectory and the external trajectory. The thresholds can be based on any aspect of the vehicle trajectory and the external trajectory. The thresholds can include position thresholds, such as clearances between the vehicle and the external vehicle. The thresholds can include velocity thresholds, such as a relative velocity threshold or a time-to-contact threshold. Including position, velocity, acceleration, and jerk in the metric, and using various thresholds in the metric provides for a robust analysis of the vehicle trajectory and the external vehicle trajectory. Thus, this technical solution can include at least a technical improvement of executing a model to continuously or repeatedly generate an output indicating trajectory of one or more external vehicles, beyond the capability of a manual process to detect and process concurrently in a compressed time frame corresponding to fractions of a second as required for effective steering and navigation of motor vehicles.

The machine learning architecture can be used to select an audiovisual device and output, using the audiovisual device, an audiovisual indication based on the metric. The audiovisual indication can be based on a field of view of the vehicle sensors, a position of the external vehicle, a velocity, acceleration, or jerk of the external vehicle, and other factors. The audiovisual indication can vary in volume, tone, pitch, pattern, color, brightness, and frequency based on the metric. Generating the metric based on the vehicle and external vehicle trajectories and outputting a corresponding audiovisual indication provides for effective communication from the vehicle. Different metrics having different characteristics can be used to output different indications from the vehicle. The vehicle can output sounds, lights, or combinations of sounds and lights based on the metric. Outputting audiovisual indications based on the vehicle trajectory and the external vehicle trajectory allows for much clearer communication from the vehicle. Instead of a simple horn honk for all communication, different audiovisual indications can be used to communicate different things from the vehicle. The audiovisual indications can vary based on urgency, proximity of the external vehicle, location of the external vehicle, but are not limited thereto. By determining the trajectory of the vehicle and the external vehicle and tailoring the audiovisual indication based on those trajectories, clear and effective communication from the vehicle to the second vehicle is achieved. Thus, this technical solution can include at least a technical improvement of generating output via a user interface including an array of audiovisual devices to communicate trajectory to an external vehicle, beyond the capability of a manual process to detect and process concurrently in a compressed time frame corresponding to fractions of a second as required for effective steering and navigation of motor vehicles.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
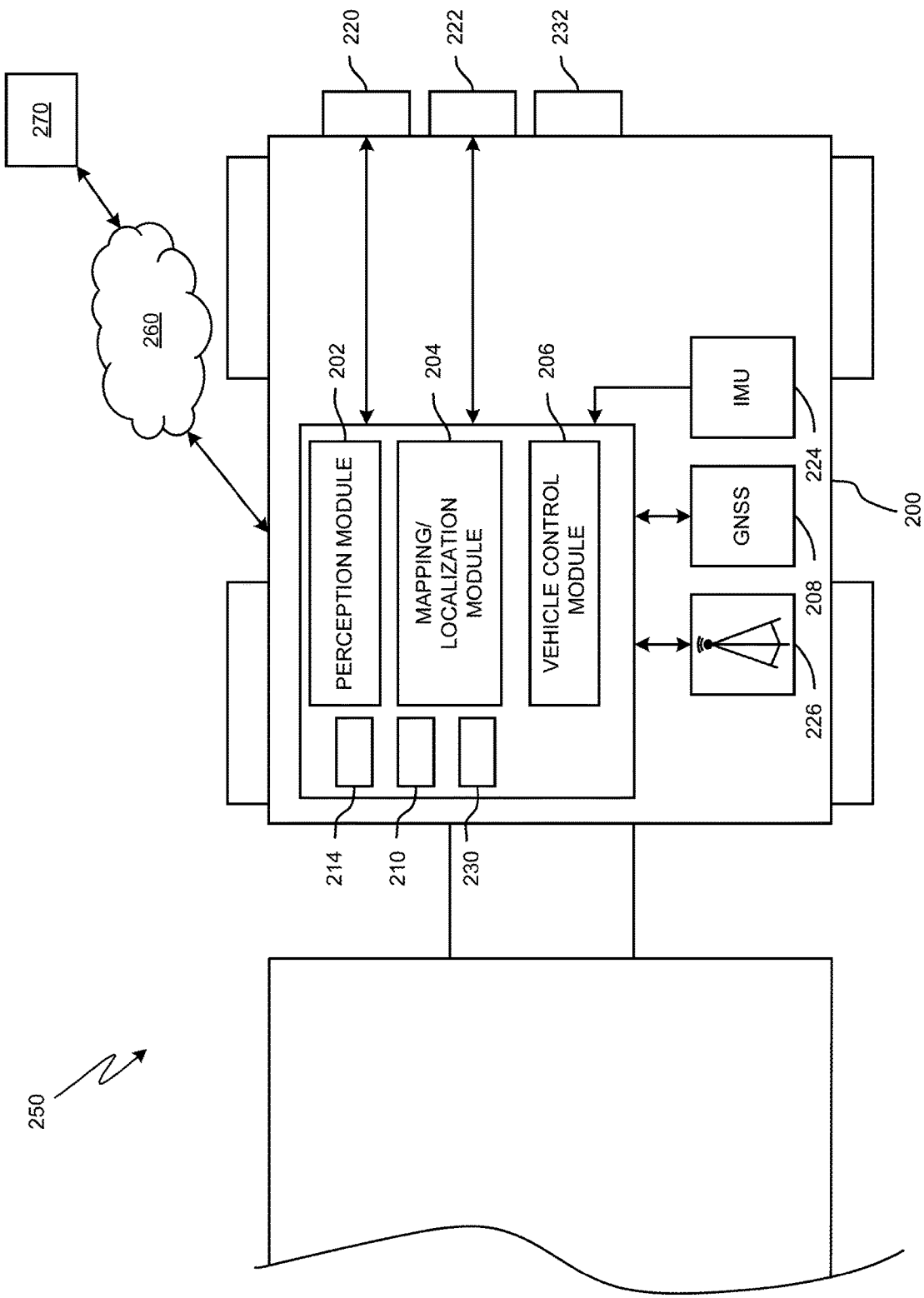
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information, etc.) generated by the object tracking and classification module 230, can be transmitted to the remote server 270 for additional processing (e.g., correction of detected misclassifications from the image data, training of artificial intelligence models, etc.).

The LiDAR system 222 may include a laser generator and a detector and can send and receive LiDAR signals. The LiDAR signal can be emitted to and received from any direction such that LiDAR point clouds (or "LiDAR images") of the areas ahead of, to the side, and behind the truck 200 can be captured and stored as LiDAR point clouds.

In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model (s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5g, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

The memory 214 of autonomy system 250 may store data and/or software routines that may assist the autonomy system 250 in performing its functions, such as the functions of the perception module 202, the mapping/localization module 204, the vehicle control module 206, and an object tracking and classification module 230. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information, etc.) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously.

With respect to FIG. 1, the truck 102 may collect perception data that indicates the presence of lane lines 116, 118, 120. Features perceived by the vehicle should generally track with one or more features stored in a digital map (e.g., in the mapping/localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module (e.g., the object detection and classification module 230) that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.) The vehicle control module 206 may be configured to avoid obstacles in the environment surrounding the truck and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

Figure 3:
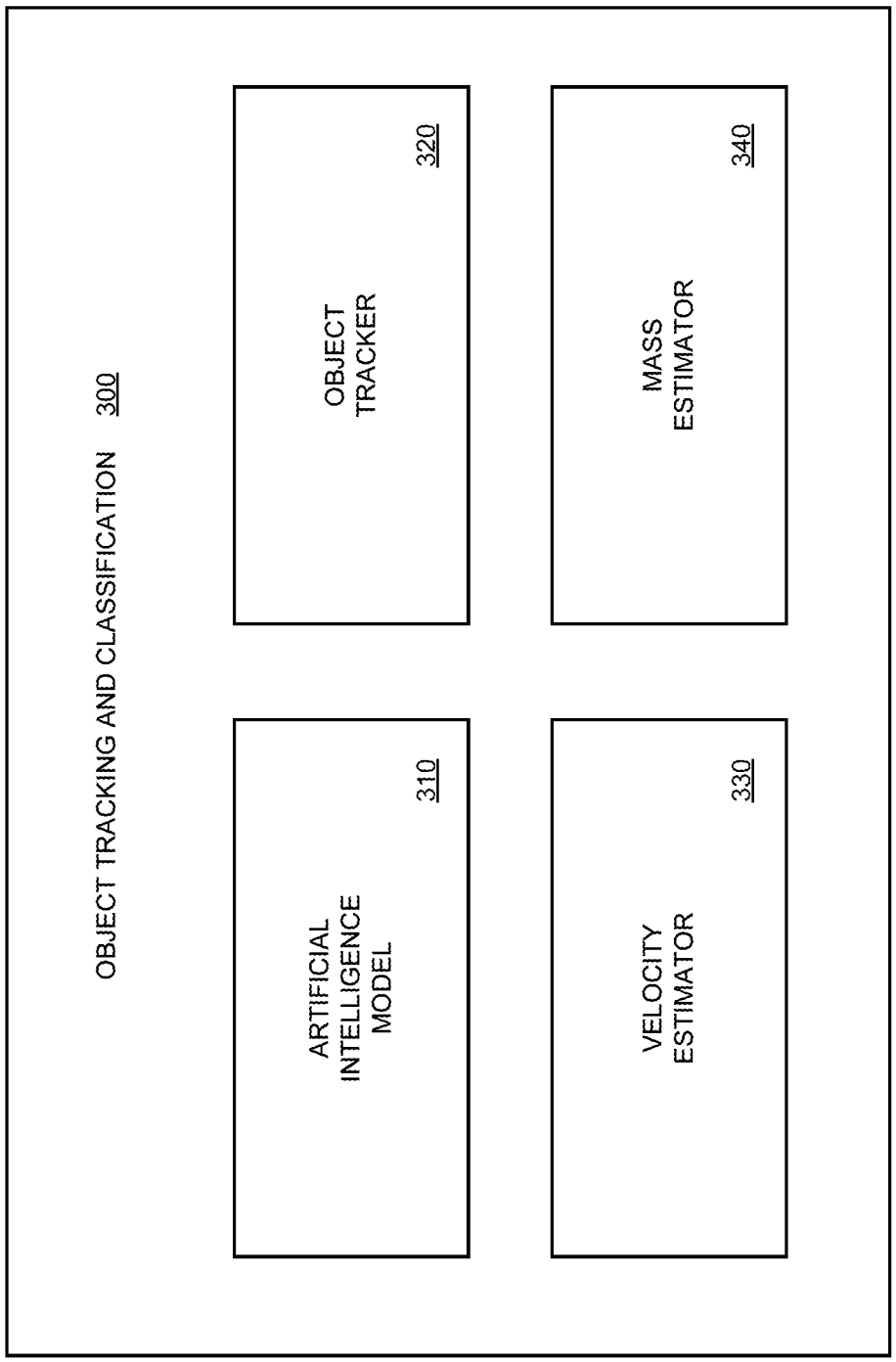
FIG. 3 is a schematic diagram of an object detection and tracking module of the autonomy system of the vehicle, according to an embodiment.

FIG. 3 shows an object tracking and classification module 300 of system 100, 250. Object tracking and classification module 300 includes artificial intelligence model 310, object tracker 320, velocity estimator 330, and effective mass estimator 340. These components of object detecting and tracking module 300 may be either or both software-based components and hardware-based components. In some embodiments, one or more components of the object tracking and classification module 300 may be stored and executed by a remote server (e.g., remote server 170 of FIG. 1, remote server 270 of FIG. 2, remote server 410*a* of FIG. 4, etc.).

In an embodiment, object tracking and classification module 230, 300 executes the artificial intelligence model 310 to detect and classify objects in sequences of images captured by at least one sensor (e.g., a camera, a video camera or video streaming device, etc.) of the autonomous vehicle. In some implementations, the artificial intelligence model 310 can be executed in response to receiving an image from at least one sensor of the autonomous vehicle. The artificial intelligence model 310 can be or may include one or more neural networks. The artificial intelligence model 310 can be a single shot multi-box detector, and can process an entire input image in one forward pass. Processing the entire input image in one forward pass improves processing efficiency, and enables the artificial intelligence model 310 to be utilized for real-time or near real-time autonomous driving tasks.

In some embodiments, the input to the artificial intelligence model 310 may be pre-processed, or the artificial intelligence model 310 itself may perform additional processing on the input data. For example, an input image to the artificial intelligence model 310 can be divided into a grid of cells of a configurable (e.g., based on the architecture of the artificial intelligence model 310) size. The artificial intelligence model 310 can generate a respective prediction (e.g., classification, object location, object size/bounding box, etc.) for each cell extracted from the input image. As such, each cell can correspond to a respective prediction, presence, and location of an object within its respective area of the input image. The artificial intelligence model 310 may also generate one or more respective confidence values indicating a level of confidence that the predictions are correct. If an object represented in the image spans multiple cells, the cell with the highest prediction confidence can be utilized to detect the object. The artificial intelligence model 310 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions.

The artificial intelligence model 310 may be or may include a deep convolutional neural network (CNN), which may include one or more layers that may implement machine-learning functionality. The one or more layers can include, in a non-limiting example, convolutional layers, max-pooling layers, activation layers and fully connected layers, among others. Convolutional layers can extract features from the input image (or input cell) using convolution operations. The convolutional layers can be followed, for example, by activation functions (e.g., a rectified linear activation unit (ReLU) activation function, exponential linear unit (ELU) activation function, etc.), model. The convolutional layers can be trained to process a hierarchical representation of the input image, where lower level features are combined to form higher-level features that may be utilized by subsequent layers in the artificial intelligence model 310.

The artificial intelligence model 310 may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the artificial intelligence model 310. The artificial intelligence model 310 may include multiple sets of convolutional layers followed by a max-pooling layer, with the max-pooling layer providing its output to the next set of convolutional layers in the artificial intelligence model. The artificial intelligence model 310 can include one or more fully connected layers, which may receive the output of one or more max-pooling layers, for example, and generate predictions as described herein. A fully connected layer may include multiple neurons, which perform a dot product between the input to the layer and a set of trainable weights, followed by an activation function. Each neuron each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input image.

The artificial intelligence model 310 may include or may utilize one or more anchor boxes to improve the accuracy of its predictions. Anchor boxes can include predetermined boxes with different aspect ratios that are used as references for final object detection predictions. The artificial intelligence model 310 can utilize anchor boxes to ensure that the bounding boxes it outputs have the correct aspect ratios for the objects they are detecting. The predetermined anchor boxes may be pre-defined or selected based on prior knowledge of the aspect ratios of objects that the model will encounter in the images captured by the sensors of autonomous vehicles. The size and aspect ratios of anchor boxes can be can determined based on statistical analysis of the aspect ratios of objects in a training dataset, for example. The anchor boxes may remain fixed in size and aspect ratio during both training and inference, and may be chosen to be representative of the objects in the target dataset.

The artificial intelligence model 310 may be trained at one or more remote servers (e.g., the remote server 170, the remote server 270, the remote server 410*a*, etc.) using any suitable machine-learning training technique, including supervised learning, semi-supervised learning, self-supervised learning, or unsupervised learning, among other techniques. In an example training process, the artificial intelligence model 310 can be trained using a set of training data that includes images of objects and corresponding ground truth data specifying the bounding boxes and classifications for those objects. The images used in the training data may be received from autonomous vehicles described herein, and the ground-truth values may be user-generated through observations and experience to facilitate supervised learning. In some embodiments, the training data may be pre-processed via any suitable data augmentation approach (e.g., normalization, encoding, any combination thereof, etc.) to produce a new dataset with modified properties to improve model generalization using ground truth.

The object tracker 320 may track objects detected in the sequences of images by the artificial intelligence model 310. The object tracker 320 may perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). To do so, the object tracker 320 may execute a discriminative correlation filter tracker with channel and spatial reliability of tracker (CSRT) to predict a position and size of a bounding box in a second image given a first image (and corresponding bounding box) as input. In some embodiments, the object tracker 320 may utilize alternative tracking algorithms, including but not limiting to Boosting, Multiple Instance Learning (MIL), or Kernelized Correlation Filter (KCF), among others.

The object tracker 320 can determine that an object has been detected in a first image of a sequence of images captured by the sensors of the autonomous vehicle. If the object has not appeared in any previous images (e.g., a tracking process has failed to associate the object with a previously tracked object in previous images), the object tracker 320 can generate a tracking identifier for the object, and begin a new tracking process for the object in the first image and subsequent images in the sequence of images. The object tracker 320 can utilize the CSRT algorithm to learn a set of correlated filters that represent detected object and its appearance in the first image, and update these filters in each subsequent image to track the object in the subsequent images. The correlation between the filters and the image is maximized to ensure that the object is accurately located in each image, while the correlation with the background is minimized to reduce false positive detections. In each subsequent incoming image (e.g., as is it captured, or as the object tracker 320 iterates through a previously captured sequence of images, etc.), the object tracker 320 can output the predicted position and size of a bounding box for the object in the subsequent image, and compare the predicted bounding box with the actual bounding box (e.g., generated by the artificial intelligence model 310) in the subsequent image.

The object tracker 320 can associate the newly detected object with the generated tracking identifier if the Intersection over Union (IOU) of the predicted bounding box and the actual bounding box is greater than a predetermined value. The object tracker 320 can calculate the IOU as the ratio of the area of the intersection of two bounding boxes to the area of their union. To calculate the IOU, the object tracker 320 can determine the coordinates of the top-left and bottom-right corners of the overlapping region between the two bounding boxes (e.g., by subtracting determined coordinates of each bounding box). Then, the object tracker 320 can calculate the width and height of the overlap and utilize the width and height to calculate the area of the overlap. The object tracker 320 can calculate the area of union as the sum of the areas of the two bounding boxes minus the area of their overlap, and then calculate the IOU as the ratio of the area of intersection to the area of the union.

In some implementations, the object tracker 320 can utilize the Kuhn-Munkres algorithm to perform matching of bounding boxes to existing tracking identifiers. The Kuhn-Munkres algorithm can be utilized to find the optimal assignment between the predicted bounding boxes and the detected bounding boxes that minimizes the sum of the costs (or maximizes the negation of the costs) associated with each assignment. The cost of an assignment may be for example, the IOU between the bounding boxes, or in some implementations, the Euclidean distance between the centers of the bounding boxes. When executing the Kuhn-Munkres algorithm, the object tracker 320 can create a cost matrix (or other similar data structure). Each element of the matrix can represent the cost of assigning a predicted bounding box to a detected bounding box. The cost matrix may represent a bipartite graph (e.g., an adjacency matrix with each edge indicated as a cost). The object tracker 320 can determine the optimal assignment (e.g., the tracking identifier to associate with the detected bounding boxes) by optimizing for the maximum sum of the negation of the cost matrix for the pairs of bounding boxes (e.g., a maximum weight matching for the weighted bipartite graph).

In some implementations, the object tracker 320 can execute the Kuhn-Munkres algorithm to determine the best matching pairs within the bipartite graph. To do so, the object tracker 320 can assign each node in the bipartite graph a value that represents the best case of matching in the bipartite graph. For any two connected nodes in the bipartite graph, that the assigned value of two nodes is larger or equal to the edge weight. In this example, each node in the bipartite graph represents a predicted bounding box or a detected bounding box, and the predicting bounding boxes can only match to the detected bounding boxes, or vice versa. In some implementations, the values can be assigned to each of the nodes representing predicted bounding boxes, and the node value of the nodes in the bipartite graph that represent detected bounding boxes can be assigned to a node value of zero.

When executing the Kuhn-Munkres algorithm, the object tracker 320 can continuously iterate through each of the nodes in the bipartite graph determined for the cost matrix to identify an augmenting path starting from unmatched edges at the node and ending in another unmatched edge. The object tracker 320 can take the negation of the augmenting path, to identify one or more matching nodes. In some cases, when executing the Kuhn-Munkres algorithm, the object tracker 320 may be unable to resolve a perfect match through negation of the augmenting path. For the unsuccessful augmenting path, the object tracker 320 can identify all the related nodes (e.g., nodes corresponding to predicted bounding boxes) and calculate a minimum amount by which to decrease their respective node value to match with their second candidate (e.g., a node representing a corresponding detected bounding box). In order to keep the sum of linked nodes the same, the amount by which the node values are increased can be added to nodes to which said nodes are matched. In some implementations, the Kuhn-Munkres algorithm can be executed when the number of predicted bounding boxes and the number of detected bounding boxes is the same. If the number of predicted bounding boxes and the number of detected bounding boxes is different, the object tracker 320 can generate placeholder data representing fake bounding boxes to satisfy the requirements of the Kuhn-Munkres algorithm.

In some implementations, the object tracker 320 can implement an occlusion strategy, which handles cases where tracking fails for two or more consecutive images. One occlusion strategy is to delete or remove the tracking identifier when an object fails to appear (or be correctly tracked) in a subsequent image in the sequence of images. Another occlusion strategy is to only delete the tracking identifier if an object has failed to be tracked for a predetermined number of images (e.g., two consecutive images, five consecutive images, ten consecutive images, etc.). This can enable the object tracker 320 to correctly detect and track objects even in cases where the artificial intelligence model 310 fails to detect an object that is present in the sequence of images for one or more consecutive images. The object tracker 320 may also execute one or more of the operations described in connection with FIGS. 5 and 6 to determine a correction to a classification of objects detected in the sequence of images.

Velocity estimator 330 may determine the relative velocity of target objects relative to the ego vehicle. Effective mass estimator 340 may estimate effective mass of target objects, e.g., based on object visual parameters signals from an object visual parameters component and object classification signals from a target object classification component. The object visual parameters component may determine visual parameters of a target object such as size, shape, visual cues and other visual features in response to visual sensor signals, and generates an object visual parameters signal. The target object classification component may determine a classification of a target object using information contained within the object visual parameters signal, which may be correlated to various objects, and generates an object classification signal. For instance, the target object classification component can determine whether the target object is a plastic traffic cone or an animal.

In some implementations, the object tracking and classification module 300 may include a cost analysis function module. The cost analysis function module may receive inputs from other components of object tracking and classification module 300 and generates a collision-aware cost function. The system 100, 250 may apply this collision-aware cost function in conjunction with other functions used in path planning. In an embodiment, the cost analysis function module provides a cost map that yields a path that has appropriate margins between the autonomous vehicle and surrounding target objects.

Objects that may be detected and analyzed by the object tracking and classification module 300 include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects can be infrastructure objects as well as temporarily-static objects such as parked cars. Externally-facing sensors may provide system 100, 250 (and the object tracking and classification module 300) with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 100, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 100, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

Figure 4:
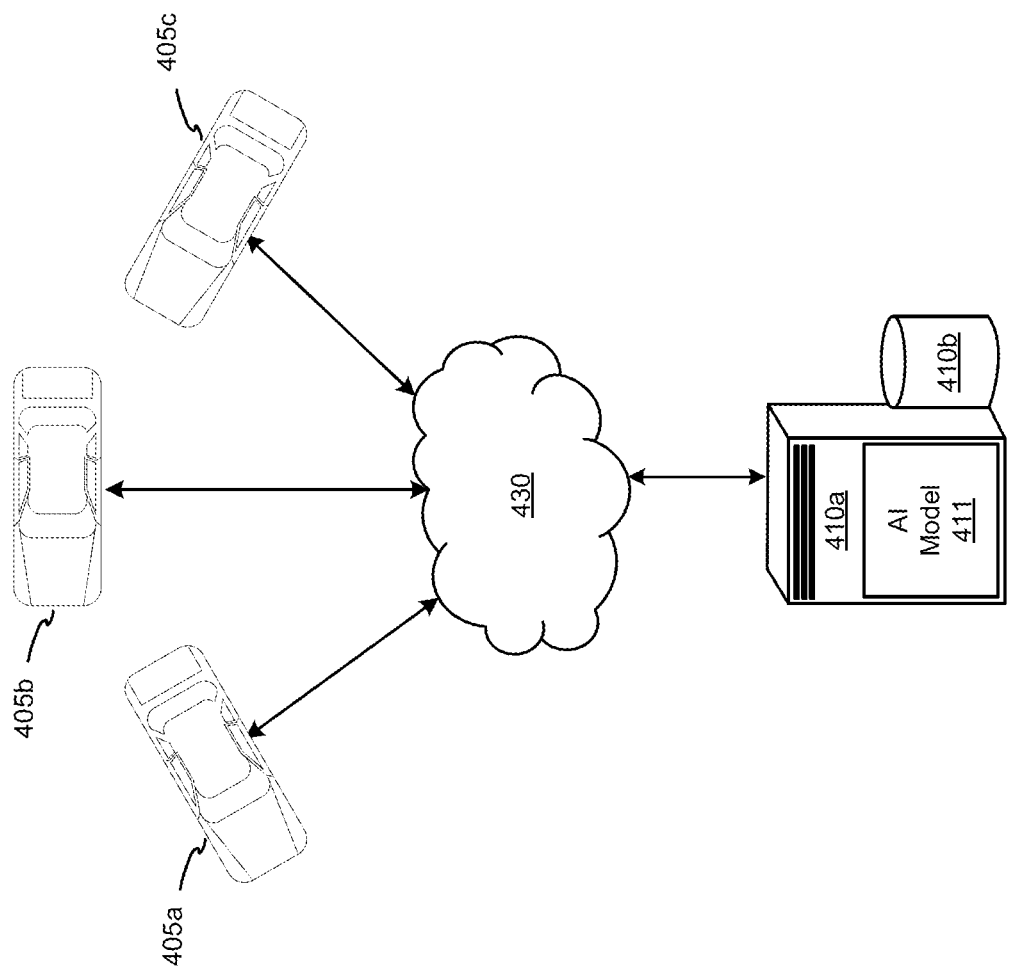
FIG. 4 is a schematic of a system for training artificial intelligence models with improved accuracy using image data, according to an embodiment.

FIG. 4 illustrates components a system 400 for training artificial intelligence models with improved accuracy using image data, according to an embodiment. The system 400 may include a remote server 410a, system database 410b, artificial intelligence models 411, and autonomous vehicles 405a-d (collectively or individually the autonomous vehicle(s) 405). In some embodiments, the system 400 may include one or more administrative computing devices that May be utilized to communicate with and configure various settings, parameters, or controls of the system 100. Various components depicted in FIG. 4 may be implemented to receive and process images captured by the autonomous vehicles 405 to train the artificial intelligence models 411, which can subsequently be deployed to the autonomous vehicles 405 to assist with autonomous navigation processes. The above-mentioned components may be connected to each other through a network 430. Examples of the network 430 may include, but are not limited to, private or public local-area-networks (LAN), wireless LAN (WLAN) networks, metropolitan area networks (MAN), wide-area networks (WAN), cellular communication networks, and the Internet. The network 430 may include wired and/or wireless communications according to one or more standards and/or via one or more transport mediums.

The system 400 is not confined to the components described herein and may include additional or other components, not shown for brevity, which are to be considered within the scope of the embodiments described herein.

The communication over the network 430 may be performed in accordance with various communication protocols such as Transmission Control Protocol and Internet Protocol (TCP/IP), User Datagram Protocol (UDP), and IEEE communication protocols. In one example, the network 430 may include wireless communications according to Bluetooth specification sets or another standard or proprietary wireless communication protocol. In another example, the network 430 may also include communications over a cellular network, including, e.g., a GSM (Global System for Mobile Communications), CDMA (Code Division Multiple Access), EDGE (Enhanced Data for Global Evolution) network.

The autonomous vehicles 405 may be similar to, and include any of the structure and functionality of, the autonomous truck 102 of FIG. 1. The autonomous vehicles 405 may include one or more sensors, communication interfaces or devices, and autonomy systems (e.g., the autonomy system 150 or the autonomy system 250, etc.). The autonomy systems of the autonomous vehicles 405 may include an object detection and tracking module (e.g., the object detection and tracking module 300 of FIG. 3). Each autonomous vehicles 405 can transmit sensor data and any data generated or processed by the autonomy system of the autonomous vehicle 405 to the remote server 410a. The autonomous vehicles 405 may transmit the information as the autonomous vehicle 405 operates, or after the autonomous vehicle 405 has ceased operation (e.g., parked, connected to a predetermined wireless or wired network, etc.).

The remote server 410a may receive sequences of images captured during operation of the autonomous vehicles 405, and perform the correction techniques described herein to generate data for training the artificial intelligence models 411. In some embodiments, the remote server 410a can include, or implement any of the functionality of, the object detection and tracking module 300 of FIG. 3. For example, the remote server 410a may receive sequences of images received from the autonomous vehicles 405a, and store the sequences of images in the system database 110b. The remote server 410a can store the sequences of images in association with metadata received from or generated based on communications with the autonomous vehicles 405. The metadata may include, for example, an identifier of autonomous vehicle 405, a timestamp corresponding to one or of the images or the sequence of images, bounding boxes detected by the autonomy system 250 of the autonomous vehicle 405, classifications determined by the autonomy system 250 of the autonomous vehicle 405, tracking identifiers corresponding to detected bounding boxes, distance information for detected objects in the sequences of images, any sensor data described herein, among other metadata.

The remote server 410a can determine one or more corrections to classifications generated by the autonomous vehicles 405. The corrections can be utilized as additional ground truth data for training the artificial intelligence model, which can be generated by the remote server 410a and stored in the system database 410b. The corrections can be determined, as described herein, by utilizing tracking information (e.g., the tracking identifiers and the bounding boxes to which they correspond) associated with objects depicted in sequences of images. The remote server 410a can determine that a classification of a tracked object in an image may not match other classifications within the sequence of images. The remote server 410a can perform a voting algorithm using the classifications corresponding to the detected object in each image of a sequence of images in which the object was detected and tracked (e.g., associated with a common tracking identifier).

In some implementations, the remote server 410a can utilize a majority-voting algorithm, in which the classification that occurs most common in the corresponding images is chosen as the corrected classification. In some implementations, the remote server 410a can utilize a normalized weighted voting algorithm. When executing the normalized weighted voting algorithm, the remote server 410a can divide the instances in which the object was detected in the sequence of images groups according to the distance of the object from the autonomous vehicle 405 that captured the sequence of images. The distance can be determined by the autonomous vehicle 405 or the remote server 410a based sensor data captured by the sensors of the autonomous vehicle 405. The remote server 410a can determine a weight value for each group, corresponding to the classification accuracy at different predetermined distances, for example. The remote server 410a can determine a candidate class label based on confidence values (e.g., generated by the artificial intelligence model that detected the bounding box in the sequence of images) associated with the detected bounding box or classification. The remote server 410a can determine a weight value for the candidate class label of each group based on a distance coefficient for the respective group. The remote server 410a can calculate the weighted sum of class confidence to determine the voted class label among the groups. In an embodiment, the distance coefficient is a hyper parameter, which can be tuned according to the classification performance of the various artificial intelligence models described herein (e.g., the artificial intelligence model 310) at different distance ranges.

In some implementations, the remote server 410a can detect one or more images in a consecutive sequence of images in which detection of an object (e.g., generation of an accurate bounding box) has failed. For example, the remote server 410a can iterate through a sequence of images and identify whether bounding boxes corresponding to a common tracking identifier appear in consecutive images. If an image between two images is missing a bounding box for the common tracking identifier of an object, the remote server 410a can determine that the respective bounding box is missing. The remote server 410a can generate a corrected bounding box by estimating the position and size of the bounding box for the image. To do so, the remote server 410a can execute the CSRT tracking algorithm to estimate the position and position and size of a bounding box for the object in the image given the previous image in the sequence in which the object was correctly detected.

The artificial intelligence models 411 may be stored in the system database 410b and may include artificial intelligence models that can detect and classify objects and images. For example, the artificial intelligence models 411 can include the artificial intelligence model 310 of FIG. 3 for one or more autonomous vehicles 405. In some implementations, the artificial intelligence models 411 may be generated or trained for on different types of cameras, autonomous vehicles 405, or environments. For example, the artificial intelligence models 411 may include multiple artificial intelligence models, each of which may be trained for a specific type of autonomous vehicle 405, a specific set of sensors deployed on an autonomous vehicle 405, or a particular environment in which one or more autonomous vehicles 405 may be deployed. One or more of the artificial intelligence models 411 may be derived from a similar base model, which may be fine-tuned for particular applications.

The artificial intelligence models 411 can be or may include one or more neural networks. The artificial intelligence models 411 can be a single shot multi-box detector, and can process an entire input image in one forward pass. Processing the entire input image in one forward pass improves processing efficiency, and enables the artificial intelligence models 411 to be utilized for real-time or near real-time autonomous driving tasks. In some embodiments, the input to the artificial intelligence models 411 may be pre-processed, or the artificial intelligence models 411 itself may perform additional processing on the input data. For example, an input image to the artificial intelligence models 411 can be divided into a grid of cells of a configurable (e.g., based on the architecture of the artificial intelligence models 411) size. The artificial intelligence models 411 can generate a respective prediction (e.g., classification, object location, object size/bounding box, etc.) for each cell extracted from the input image. As such, each cell can correspond to a respective prediction, presence, and location of an object within its respective area of the input image.

The artificial intelligence models 411 may also generate one or more respective confidence values indicating a level of confidence that the predictions are correct. If an object represented in the image spans multiple cells, the cell with the highest prediction confidence can be utilized to detect the object. The artificial intelligence models 411 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions. The artificial intelligence models 411 may be or may include a deep CNN, which may include one or more layers that may implement machine-learning functionality. The one or more layers can include, in a non-limiting example, convolutional layers, max-pooling layers, activation layers and fully connected layers, among others.

The remote server 410a can train one or more of the artificial intelligence models 411 using training data stored in the system database 410b. In an example training process, the artificial intelligence models 411 can be trained using a set of training data that includes images of objects and corresponding ground truth data specifying the bounding boxes and classifications for those objects. The images used in the training data may be received from the autonomous vehicles 405, and the ground-truth values may be user-generated through observations and experience to facilitate supervised learning. In some embodiments, at least a portion of the ground truth data can be generated by the remote server 410a using the correction techniques described herein. In some embodiments, the training data may be pre-processed via any suitable data augmentation approach (e.g., normalization, encoding, any combination thereof, etc.) to produce a dataset with modified properties to improve model generalization using the ground truth.

The remote server 410a can train an artificial intelligence model 411, for example, by performing supervised learning techniques to adjust the parameters of the artificial intelligence model 411 based on a loss computed from the output generated by the artificial intelligence model 411 and ground truth data corresponding to the input provided to the artificial intelligence model 411. Inputs to the artificial intelligence model 411 may include images or sequences of images captured during operation of autonomous vehicles 405, and stored in the system database 110b. The artificial intelligence model 411 may be trained on a portion of the training data using a suitable optimization algorithm, such as stochastic gradient descent. The remote server 410a can train the artificial intelligence model 411 by minimizing the calculated loss function by iteratively updating the trainable parameters of the artificial intelligence model 411 (e.g., using backpropagation, etc.). The remote server 410a can evaluate the artificial intelligence model 411 on a held-out portion of the training data (e.g., validation set that was not used to train the artificial intelligence model 411) to assess the performance of the artificial intelligence model 411 on unseen data. The evaluation metrics used to assess the model's performance may include accuracy, precision, recall, and F1 score, among others.

The remote server 410a can train an artificial intelligence model 411 until a training termination condition is met. Some non-limiting training termination conditions include a maximum number of iterations being met or a predetermined performance threshold being met. The performance threshold can be satisfied when the artificial intelligence model 411 reaches a certain level of accuracy, F1 score, precision, recall, or any other relevant metric on a validation set. The remote server 410 can provide the trained artificial intelligence model 411 one or more autonomous vehicles 405 for which the artificial intelligence model 411 was trained. The autonomous vehicle(s) 405 can then utilize the artificial intelligence model 411 to detect and classify objects in real-time or near real-time, as described herein.

The remote server 410a can update one or more of the artificial intelligence models 411 (e.g., by retraining, fine-tuning, or other types of training processes) when sequences of images are received from the autonomous vehicles 405 and utilized to produce additional training data. The remote server 410a (or the autonomy systems of the autonomous vehicles 405) can generate the additional training data by determining corrections to classifications made by the artificial intelligence model executing on the autonomous vehicle. The corrected classifications and bounding boxes can be utilized as ground truth data for the images in the sequences of images to which they correspond. Although the artificial intelligence models 411 can include neural networks trained using supervised learning techniques, it should be understood that any alternative and/or additional machine learning model(s) may be used to implement similar learning engines.

Figure 5A:
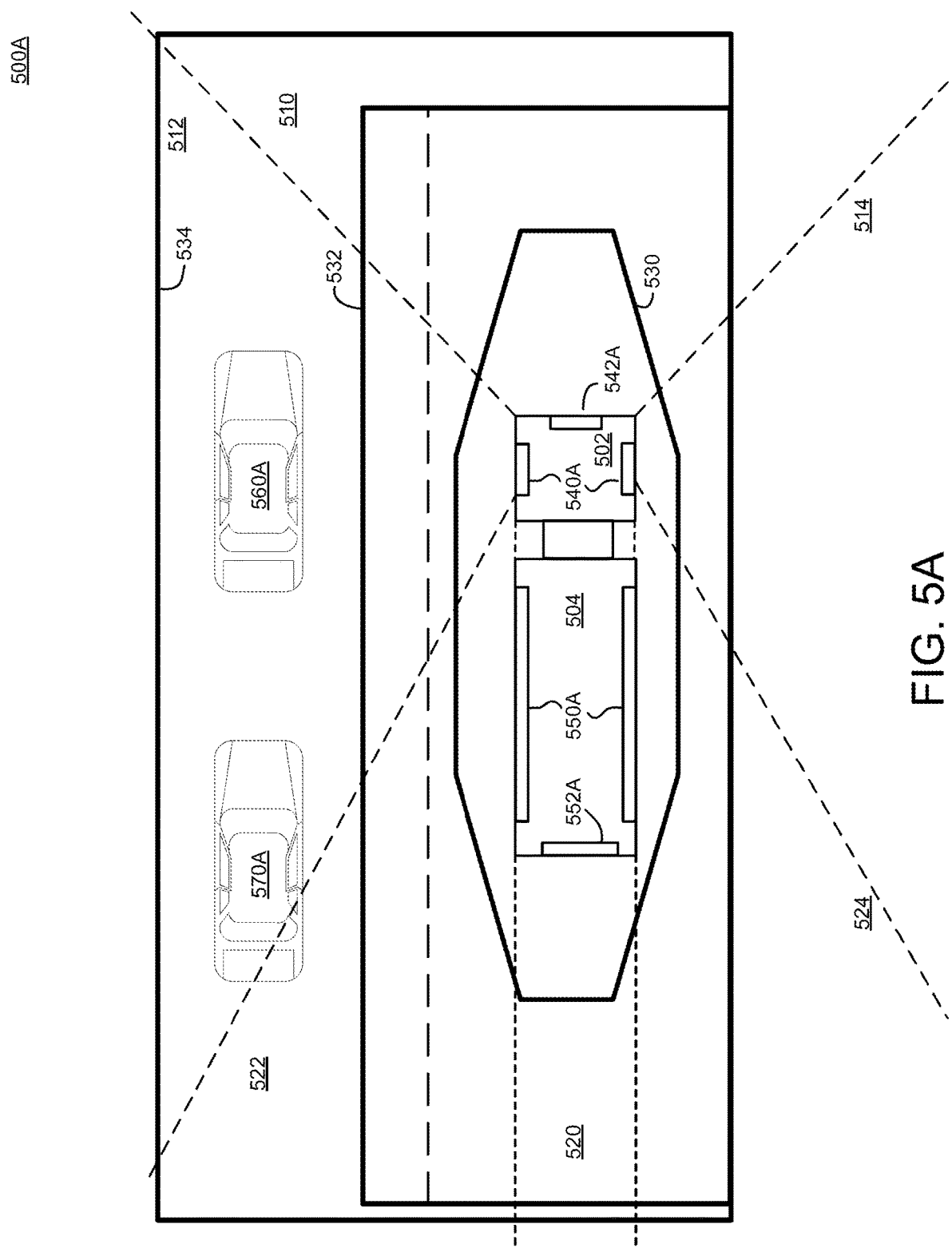
FIG. 5A depicts an example vehicle environment, in accordance with present implementations.

FIG. 5A depicts an example vehicle environment, in accordance with present implementations. As illustrated by way of example in FIG. 5A, an example vehicle environment 500A can include at least a vehicle 502, a trailer 504, a forward field of view 510, a forward-left field of view 512, a forward-right field of view 514, a rear field of view 520, a rear-left field of view 522, a rear-right field of view 524, a first external vehicle 560A, and a second external vehicle 570A.

The vehicle 502 can be a car, truck, tractor-trailer, or any kind of vehicle. The vehicle may be completely autonomous (fully-autonomous), such as self-driving, driverless, or Level 4 autonomy, or semi-autonomous, such as Level 3 autonomy. In some implementations, the vehicle 502 may be the vehicle 102 discussed in conjunction FIG. 1. The vehicle 502 can include a contact threshold 530, an event threshold 532, an environment threshold 534, a lateral clearance indicator 540A, and a forward clearance indicator 542A. The vehicle 502 can include one or more processors coupled to non-transitory memory. The non-transitory memory can include instructions which, when executed by the processor, cause the processor to perform processes discussed herein.

The forward field of view 510 can be a field of view extending in front of the vehicle 502 of one or more sensors of the vehicle 502. The forward field of view 510 can be a field of view of a sensor facing in front of the vehicle 502 or an aggregate field of view of multiple sensors facing in front of the vehicle 502. The forward field of view 510 can be a predetermined area or arc in front of the vehicle 502.

The forward-left field of view 512 can be a field of view extending in front and to the left of the vehicle 502. The forward-left field of view 512 can be a field of view of one or more sensors of the vehicle 502. The forward-left field of view 512 can be a field of view of a sensor facing in front and to the left of the vehicle 502 or an aggregate field of view of multiple sensors facing in front and to the left of the vehicle 502. The forward-left field of view 510 can be a predetermined area or arc in front of and to the left of the vehicle 502.

The forward-right field of view 514 can be a field of view extending in front and to the right of the vehicle 502. The forward-right field of view 514 can be a field of view of one or more sensors of the vehicle 502. The forward-right field of view 514 can be a field of view of a sensor facing in front and to the right of the vehicle 502 or an aggregate field of view of multiple sensors facing in front and to the right of the vehicle 502. The forward-right field of view 510 can be a predetermined area or arc in front of and to the right of the vehicle 502.

The forward field of view 510 can be between the forward-left field of view 512 and the forward-right field of view 514. The forward field of view 510 can overlap with the forward-left field of view 512 and the forward-right field of view 514.

The rear field of view 520 can be a field of view extending behind the vehicle 502 of one or more sensors of the vehicle 502. The rear field of view 520 can be a field of view of a sensor facing in front of the vehicle 502 or an aggregate field of view of multiple sensors facing behind the vehicle 502. The rear field of view 520 can be a predetermined area or arc behind the vehicle 502.

The rear-left field of view 522 can be a field of view extending behind and to the left of the vehicle 502. The rear-left field of view 522 can be a field of view of one or more sensors of the vehicle 502. The rear-left field of view 522 can be a field of view of a sensor facing behind and to the left of the vehicle 502 or an aggregate field of view of multiple sensors facing behind and to the left of the vehicle 502. The rear-left field of view 510 can be a predetermined area or arc behind and to the left of the vehicle 502.

The rear-right field of view 524 can be a field of view extending behind and to the right of the vehicle 502. The rear-right field of view 524 can be a field of view of one or more sensors of the vehicle 502. The rear-right field of view 524 can be a field of view of a sensor facing behind and to the right of the vehicle 502 or an aggregate field of view of multiple sensors behind and to the right of the vehicle 502. The rear-right field of view 510 can be a predetermined area or arc behind and to the right of the vehicle 502.

The rear field of view 520 can be between the rear-left field of view 522 and the rear-right field of view 524. The rear field of view 520 can overlap with the rear-left field of view 512 and the rear-right field of view 514.

The vehicle 502 can have a plurality of sensors. The plurality of sensors may have an aggregate field of view around the vehicle 502. The forward field of view 510, the forward-left field of view 512, the forward-right field of view 514, the rear field of view 520, the rear-left field of view 522, and the rear-right field of view 524 can be partitions of the aggregate field of view of the plurality of sensors.

The contact threshold 530 can define a first space around the vehicle 502. The contact threshold 530 can define a space around the vehicle 502 within which contact between an object and the vehicle is likely. Likely contact can be based on the vehicle trajectory and the object trajectory. In an example, contact between the vehicle 502 and the object is likely if the object trajectory will cause the object to contact the vehicle 502 within a predetermined amount of time, such as five seconds. In another example, contact between the vehicle 502 and the object is likely if the object is within a predetermined distance from a particular portion of the vehicle 502, such as one meter. In another example, an object within the contact threshold 530 may have a probability of contacting the vehicle 502 which exceeds a predetermined threshold, such as 40%, 50%, or 60%. The contact threshold 530 can indicate a type of clearance between the vehicle 502 and an object. The type of clearance may be a probability of contact and/or a distance between the object and the vehicle 502. The contact threshold 530 may be static or dynamic. The contact threshold 530 can change size and/or shape based on movement of the vehicle 502. In an example, the contact threshold 530 may be larger when the vehicle 502 is moving than when the vehicle 502 is stationary. In another example, the contact threshold 530 may extend in a direction in which the vehicle 502 is turning. The contact threshold 530 can change size and/or shape based on movement of an object. In an example, the contact threshold 530 can be larger when a nearby object is moving at a higher speed than when the object is moving at a lower speed. In another example, the contact threshold 530 can be smaller when a nearby object is moving parallel to movement of the vehicle 502 than when object is moving in a direction that is not parallel to the movement of the vehicle 502.

The contact threshold 530 can be any three-dimensional or two-dimensional shape. The contact threshold 530 can include a front portion, a back portion, and side portions. The front portion can extend in front of the vehicle 502 a first distance. The back portion can extend behind the vehicle 502 a second distance. In some implementations, the first distance and the second distance are the same. The side portions may extend out from sides of the vehicle 502 a third distance. In some implementations, the side portions extend different distances from the sides of the vehicle 502. The contact threshold 530 may have a shape corresponding to one or more of a shape of the vehicle 502 and range of sensors of the vehicle 501.

The event threshold 532 can define a second space around the vehicle 502. The event threshold 532 can define a space around the vehicle 502 within which a probability of an event exceeds a predetermined threshold. The event threshold 532 can indicate a type of clearance between the vehicle 502 and an object. The type of clearance may be a probability of contact and/or a distance between the object and the vehicle 502. The event can be an action associated with an object external the vehicle 502 or an action taken by the vehicle 502. The event can be a collision, a warning indication from the vehicle 502, a course adjustment of the vehicle 502, or a speed adjustment of the vehicle 502. The vehicle 502 can determine an action to take based on the object being within the event threshold 532. The vehicle 502 can determine an action to take based on a velocity of the object within the event threshold 532. In an example, the vehicle 502 can determine to issue a warning notification based on an object being within the event threshold 532.

The event threshold 532 can be any three-dimensional or two-dimensional shape. The event threshold 532 can surround and include the contact threshold 530. The event threshold 532 can be static or dynamic. The event threshold may change size and/or shape based on based on the movement of the vehicle 502. In an example, the event threshold 532 may be larger when the vehicle 502 is moving than when the vehicle 502 is stationary. In another example, the event threshold 532 may extend in a direction in which the vehicle 502 is turning. The event threshold 532 can change size and/or shape based on movement of an object. In an example, the event threshold 532 can be larger when a nearby object is moving at a higher speed than when the object is moving at a lower speed. In another example, the event threshold 532 can be smaller when a nearby object is moving parallel to movement of the vehicle 502 than when the object is moving in a direction that is not parallel to the movement of the vehicle 502.

The contact threshold 530 and the event threshold 532 may include sub-thresholds. The vehicle 502 may determine an event or a probability of contact based an object being within a subthreshold of the event threshold 532 or contact threshold 530. In some implementations, the contact threshold 530 and/or the event threshold 532 include a gradient. The vehicle 502 may determine an event or a probability of contact based on a location of an object within the gradient.

The environment threshold 534 can define a third space around the vehicle 502. The environment threshold 534 can be any three-dimensional or two-dimensional shape. In some implementations, the environment threshold 534 extends as far as a range of sensors of the vehicle 502. The environment threshold 534 can be an area within which the sensors of the vehicle can sense a surrounding environment. The environment threshold 534 can surround and include the event threshold 532 and the contact threshold 530.

The vehicle 502 can track objects in the environment threshold 534, the event threshold 532, and the contact threshold 530. The vehicle 502 can track the first external vehicle 560A and the second external vehicle 570A. The vehicle 502 can generate a metric based on a trajectory of the first external vehicle 560A. The vehicle 502 can generate the metric based on one or more aspects of the trajectory of the first external vehicle 560A, such as position, velocity, acceleration, and jerk. Position can be defined along three axes in three-dimensional space. Velocity can correspond to a rate of change of position, where velocity includes speed and direction. Acceleration can correspond to a rate of change of velocity, and jerk can correspond to a rate of change of acceleration. Velocity, acceleration, and jerk can each include rates of change along each of the three axes of position. The position of the first external vehicle 560A may include whether the first external vehicle 560A is within the environment threshold 534, the event threshold 532, or the contact threshold 530. The vehicle 502 can generate the metric based on a trajectory of the vehicle 502. The vehicle 502 can output an indication having a property based on the metric using one or more of the lateral clearance indicator 540A, the forward clearance indicator 542A, a lateral clearance indicator 550A, and a rear clearance indicator 552A. The indication can include, but is not limited to, a light emission and/or a sound. The property can include a volume, pitch, tone, modulation, frequency, intensity, brightness, pattern, or color of the indication.

The vehicle 502 can determine a type of clearance between the first external vehicle 560A and the vehicle 502 based on the metric satisfying a threshold indicating the type of clearance, such as the event threshold 532 or the contact threshold 530. The clearance can be based on at least one of a distance between the vehicle 502 and the first external vehicle 560A, a relative velocity between the vehicle 502 and the first external vehicle 560A, a relative acceleration between the vehicle 502 and the first external vehicle 560A, or a relative jerk between the vehicle 502 and the first external vehicle 560A. The property of the indication can be based on the type of clearance between the vehicle 502 and the first external vehicle 560A.

The vehicle 502 can determine a type of movement of the first external vehicle 560A based on the metric satisfying a threshold indicating the type of movement. The type of movement can be based on at least one of a velocity of the first external vehicle 560A, an acceleration of the first external vehicle 560A, or a jerk of the first external vehicle 560A. The property of the indication can be based on the type of movement of the first external vehicle 560A.

The metric can include a scalar value of a gradient at one or more bounds of a range of an output of the audiovisual device. In an example, the bounds of a range of an output of a speaker are the maximum and minimum value. The gradient can include a linear gradient between the bounds of the range of the output of the audiovisual device. The property of the indication can be based on the scalar value. In an example, the property is medium volume and the scalar value is fifty for volume where the audiovisual device has a volume range from zero to one hundred.

The lateral clearance indicator 540A can include an audiovisual device which can output audiovisual indications. The lateral clearance indicator 540A can include one or more speakers and one or more lights or displays. The lateral clearance indicator 540A can be attached to a side of the vehicle 502. The lateral clearance indicator 540A can be removably attached to the side of the vehicle 502. The lateral clearance indicator 540A can be used to output audiovisual indications corresponding to a lateral clearance between an object, such as the first external vehicle 560A, and the vehicle 502. In an example, the vehicle 502 can output an audiovisual indication using the lateral clearance indicator 540A based on the first external vehicle 560A being within the event threshold 532 such that a lateral clearance between the vehicle 502 and the first external vehicle 560A is below a predetermined threshold.

The forward clearance indicator 542A can include an audiovisual device which can output audiovisual indications. The forward clearance indicator 542A can include one or more speakers and one or more lights or displays. The forward clearance indicator 542A can be attached to a front of the vehicle 502. The forward clearance indicator 542A can be removably attached to the front of the vehicle 502. The forward clearance indicator 542A can be used to output audiovisual indications corresponding to a front clearance between an object, such as the first external vehicle 560A, and the vehicle 502. The forward clearance indicator 542A can be used to output audiovisual indications corresponding to a forward clearance between an object, such as the first external vehicle 560A, and the vehicle 502. In an example, the vehicle 502 can output an audiovisual indication using the forward clearance indicator 542A based on the first external vehicle 560A being within the event threshold 532 such that a forward clearance between the vehicle 502 and the first external vehicle 560A is below a predetermined threshold.

The trailer 504 can be a detachable trailer. The trailer 504 can be electrically connected to the vehicle 502. The vehicle 502 can control brakes, brake lights, and signal lights of the trailer 504. The trailer 504 can include a lateral clearance indicator 550A, and a rear clearance indicator 552A.

The lateral clearance indicator 550A can be an audiovisual device which can output audiovisual indications. The lateral clearance indicator 550A can include one or more speakers and one or more lights or displays. The lateral clearance indicator 550A can be attached to a side of the trailer 504. The lateral clearance indicator 550A can be removably attached to the side of the trailer 504. The lateral clearance indicator 550A can be used to output audiovisual indications corresponding to a lateral clearance between an object, such as the first external vehicle 560A, and the vehicle 502. In an example, the vehicle 502 can output an audiovisual indication using the lateral clearance indicator 550A based on the first external vehicle 560A being within the event threshold 532 such that a lateral clearance between the vehicle 502 and the first external vehicle 560A is below a predetermined threshold.

The rear clearance indicator 552A can include an audiovisual device which can output audiovisual indications. The rear clearance indicator 552A can include one or more speakers and one or more lights or displays. The rear clearance indicator 552A can be attached to a rear of the trailer 504. The rear clearance indicator 552A can be removably attached to the rear of the trailer 504. The rear clearance indicator 552A can be used to output audiovisual indications corresponding to a rear clearance between an object, such as the first external vehicle 560A, and the vehicle 502. In an example, the vehicle 502 can output an audiovisual indication using the rear clearance indicator 552A based on the first external vehicle 560A being within the event threshold 532 such that a rear clearance between the vehicle 502 and the first external vehicle 560A is below a predetermined threshold. As discussed herein, an audiovisual device is not limited to the particular devices discussed herein, and can include, but is not limited to, one or more projectors configured to project one or more indications on a surface external to the vehicle 502. For example, a projector can project an indication on a road surface within a field of view of the projector.

The first external vehicle 560A can include, but is not limited to, a car, truck, tractor-trailer, bicycle or any kind of vehicle. The second external vehicle 570A can include, but is not limited to, a car, truck, tractor-trailer, bicycle or any kind of vehicle. For example, the vehicle environment 500A can include one or more pedestrians that can be identified as discussed herein, in place of or in addition to one or more of the first external vehicle 560 and the second external vehicle 570A.

Figure 5B:
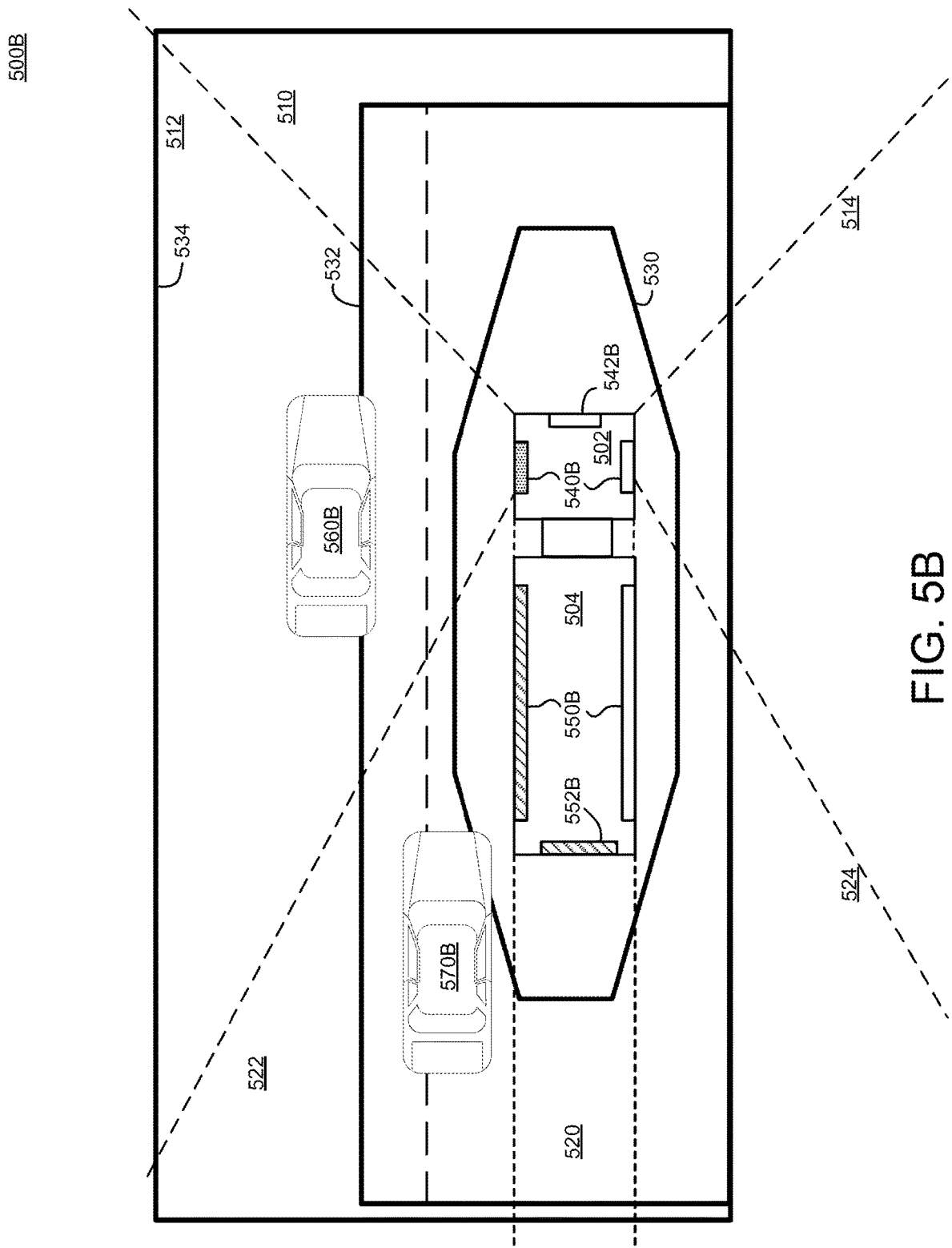
FIG. 5B depicts an example first vehicle response environment, in accordance with present implementations.

FIG. 5B depicts an example first vehicle response environment, in accordance with present implementations. As illustrated by way of example in FIG. 5B, an example first vehicle response environment 500B can include at least a lateral clearance indicator 540B, a forward clearance indicator 542B, a lateral clearance indicator 550B, a rear clearance indicator 552B, a first external vehicle 560B, and a second external vehicle 570B. The example first vehicle response environment 500B can be the example first vehicle response environment 500A of FIG. 5A, with the first external vehicle 560B and the second external vehicle 570B near the vehicle 502.

The lateral clearance indicator 540B can output a first audiovisual indication based on the first external vehicle 560B being within the forward-left field of view 512 and within the event threshold 532. A volume, tone, intensity, and/or color of the first audiovisual indication can be based on one or more properties of a trajectory of the first external vehicle 560B. The lateral clearance indicator 540B can output the first audiovisual indication such that the first audiovisual indication is visible to the first external vehicle 560B in the forward-left field of view 512.

The lateral clearance indicator 550B can output a second audiovisual indication based on the second external vehicle 570B being within the rear-left field of view 522 and within the contact threshold 530. A volume, tone, intensity, and/or color of the second audiovisual indication can be based on one or more properties of a trajectory of the first external vehicle 560B. The lateral clearance indicator 550B can output the second audiovisual indication such that the second audiovisual indication is visible to the second external vehicle 570B in the rear-left field of view 522. The rear clearance indicator 552B can output a third audiovisual indication based on the second external vehicle 570B being within the rear-left field of view 522 and within the contact threshold 530. A volume, tone, intensity, and/or color of the third audiovisual indication can be based on one or more properties of a trajectory of the first external vehicle 560B. The rear clearance indicator 552B can output the second audiovisual indication such that the second audiovisual indication is visible to the second external vehicle 570B in the rear-left field of view 522. The second audiovisual indication and the third audiovisual indication can have identical properties.

The second audiovisual indication can be different than the first audiovisual indication. The second audiovisual indication can have a greater volume, intensity, frequency, brightness, or higher tone than the first audiovisual indication based on the second external vehicle 570B being closer to the vehicle 502 than the first external vehicle 560B. The second audiovisual indication can have a greater volume, intensity, frequency, brightness, or higher tone than the first audiovisual indication based on the second external vehicle 570B having a higher velocity relative to the vehicle 502 than the first external vehicle 560B. The second audiovisual indication can have a greater volume, intensity, frequency, brightness, or higher tone than the first audiovisual indication based on the second external vehicle 570B having a higher acceleration relative to the vehicle 502 than the first external vehicle 560B. The second audiovisual indication can have a greater volume, intensity, frequency, brightness, or higher tone than the first audiovisual indication based on the second external vehicle 570B having a higher jerk relative to the vehicle 502 than the first external vehicle 560B. The first audiovisual indication can have a greater volume, intensity, frequency, brightness, or higher tone than the second audiovisual indication based on a velocity, acceleration, or jerk of the second external vehicle 570B relative to the vehicle 502 than the first external vehicle 560B despite the second external vehicle 570B being closer to the vehicle 502 than the first external vehicle 560B.

Figure 5C:
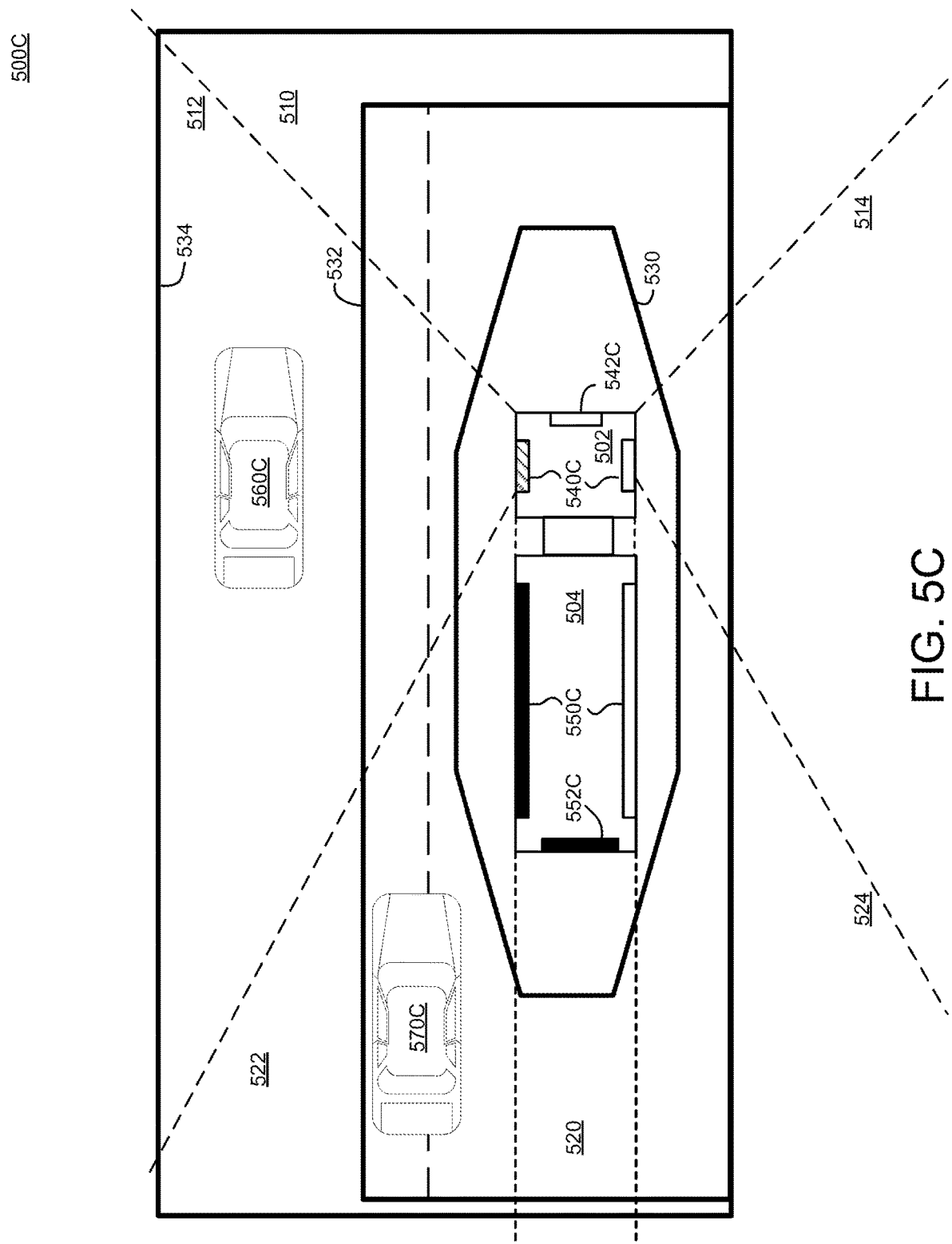
FIG. 5C depicts an example second vehicle response environment, in accordance with present implementations.

FIG. 5C depicts an example second vehicle response environment, in accordance with present implementations. As illustrated by way of example in FIG. 5C, an example second vehicle response environment 500C can include at least a lateral clearance indicator 540C, a lateral clearance indicator 550O, a forward clearance indicator 552C, a first external vehicle 560C, and a second external vehicle 570C. The first external vehicle 560C can be within the environment threshold 534 but outside of the event threshold 532. The second external vehicle 570C can be within the event threshold 532 but outside of the contact threshold 530.

The lateral clearance indicator 540C can output a first audiovisual indication based on the second external vehicle 570C being within the rear-left field of view 522 and within the event threshold 532. A volume, tone, intensity, and/or color of the first audiovisual indication can be based on one or more properties of a trajectory of the first external vehicle 570C and the second external vehicle 570C being in the rear-left field of view 522 and not in the front-left field of view 512. The lateral clearance indicator 540C can output the first audiovisual indication such that the first audiovisual indication is visible to the second external vehicle 570C in the rear-left field of view 522.

The lateral clearance indicator 550C can output a second audiovisual indication based on the second external vehicle 570C being within the rear-left field of view 522 and within the contact threshold 530. A volume, tone, intensity, and/or color of the second audiovisual indication can be based on one or more properties of a trajectory of the first external vehicle 560B. The lateral clearance indicator 550C can output the second audiovisual indication such that the second audiovisual indication is visible to the second external vehicle 570C in the rear-left field of view 522. The rear clearance indicator 552C can output a third audiovisual indication based on the second external vehicle 570C being within the rear-left field of view 522 and within the contact threshold 530. A volume, tone, intensity, and/or color of the third audiovisual indication can be based on one or more properties of a trajectory of the first external vehicle 560B. The rear clearance indicator 552C can output the second audiovisual indication such that the second audiovisual indication is visible to the second external vehicle 570C in the rear-left field of view 522. The second audiovisual indication and the third audiovisual indication can have identical properties.

The second audiovisual indication can be different than the first audiovisual indication. The second audiovisual indication can have a greater volume, intensity, frequency, brightness, or higher tone than the first audiovisual indication based on the second external vehicle 570C being in the rear-left field of view 522 and not in the front-left field of view 512. The second audiovisual indication can be different than the first audiovisual indication based on a relative distance between the rear clearance indicator 552C and the second external vehicle 570C, a relative distance between the lateral clearance indicator 550C and the second external vehicle 570C, and a relative distance between the lateral clearance indicator 540C and the second external vehicle 570C.

The front clearance indicator 542C, the lateral clearance indicator 540C, the lateral clearance indicator 550C, and the rear clearance indicator 552C can output visual indicators based on an object or vehicle being within their corresponding fields of view, based on the respective clearance indicator being visible from a field of view, or based on other factors.

Figure 6A:
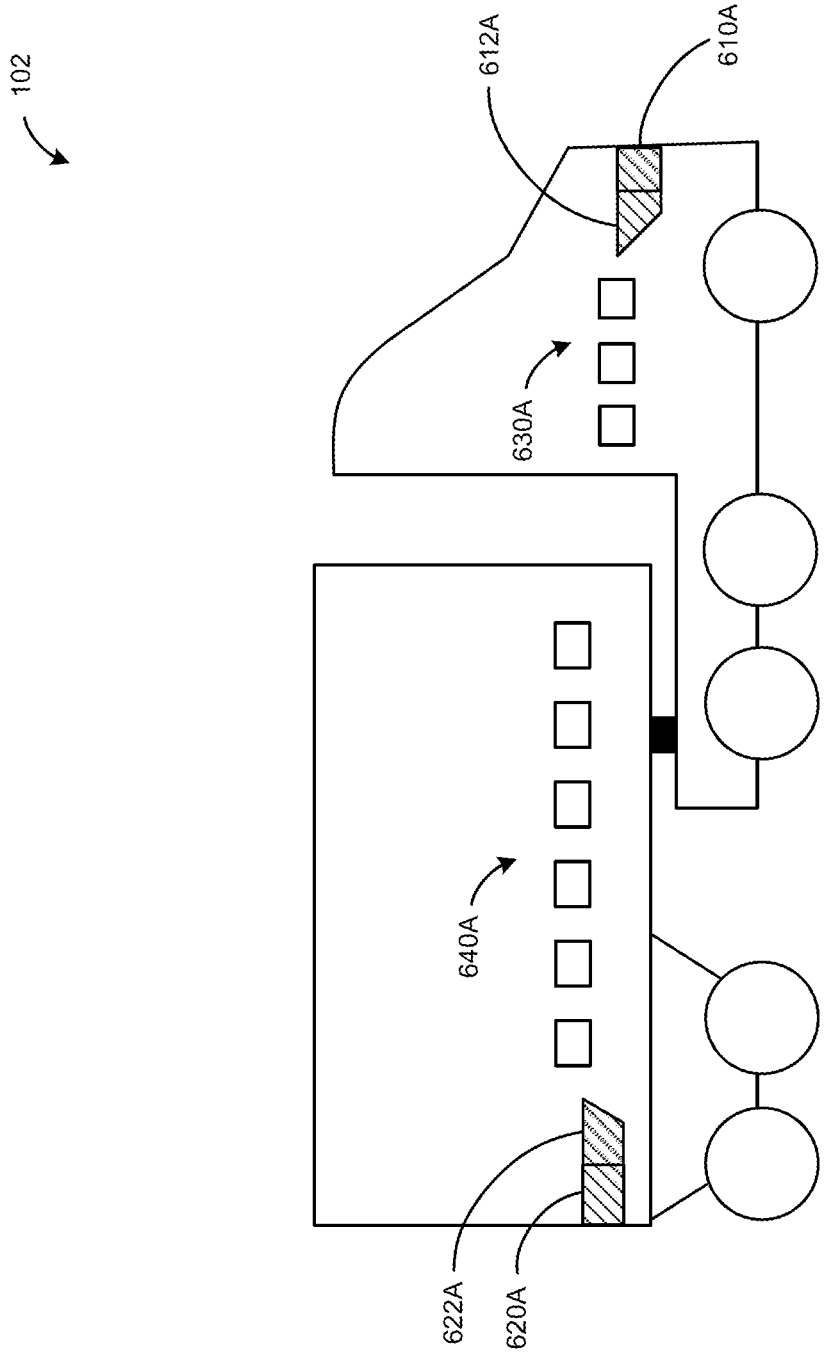
FIG. 6A depicts an example indicator device state, in accordance with present implementations.

FIG. 6A depicts an example indicator device state 600A, in accordance with present implementations. As illustrated by way of example in FIG. 6A, an example indicator device state 600A can include at least a vehicle 102, a headlight 610A, a forward signal light 612A, a taillight 620A, a rear signal light 622A, a vehicle audiovisual device array 630A, and a trailer audiovisual device array 640A.

The headlight 610A can be a stock headlight of the vehicle 102. The vehicle 102 can use the headlight 610A to output an indication, as discussed herein. The headlight 610A can output a visual indication having a brightness, intensity, pattern, and frequency. The headlight 610A can be part of the forward clearance indicator 542A or be the forward clearance indicator 542A as in FIG. 5A. The headlight 610A can output a particular output based on a metric generated based on a trajectory of the vehicle 102 and a trajectory of an object. The headlight 610A can output a particular output based on the object being within one or more thresholds associated with the vehicle. The headlight 610A can output a particular output based on one or more aspects of the trajectory of the vehicle 102 and the trajectory of the object.

The forward signal light 612A can be a stock signal light of the vehicle 102. The vehicle 102 can use the forward signal light 612A to output an indication, as discussed herein. The forward signal light 612A can output a visual indication having a brightness, intensity, pattern, and frequency. The forward signal light 612A can be part of the forward clearance indicator 542A or be the forward clearance indicator 542A as in FIG. 5A. The forward signal light 612A can be part of the lateral clearance indicator 540A or be the lateral clearance indicator 540A as in FIG. 5A. The forward signal light 612A can output a particular output based on a metric generated based on a trajectory of the vehicle 102 and a trajectory of an object. The forward signal light 612A can output a particular output based on the object being within one or more thresholds associated with the vehicle. The forward signal light 612A can output a particular output based on one or more aspects of the trajectory of the vehicle 102 and the trajectory of the object.

The taillight 620A can be a stock taillight of the vehicle 102. The vehicle 102 can use the taillight 620A to output an indication, as discussed herein. The taillight 620A can output a visual indication having a brightness, intensity, pattern, and frequency. The taillight 620A can be part of the rear clearance indicator 552A or be the rear clearance indicator 552A as in FIG. 5A. The taillight 620A can output a particular output based on a metric generated based on a trajectory of the vehicle 102 and a trajectory of an object. The taillight 620A can output a particular output based on the object being within one or more thresholds associated with the vehicle. The taillight 620A can output a particular output based on one or more aspects of the trajectory of the vehicle 102 and the trajectory of the object.

The rear signal light 622A can be a stock rear signal light of the vehicle 102. The vehicle 102 can use the rear signal light 622A to output an indication, as discussed herein. The rear signal light 622A can output a visual indication having a brightness, intensity, pattern, and frequency. The rear signal light 622A can be part of the rear clearance indicator 552A or be the rear clearance indicator 552A as in FIG. 5A. The rear signal light 622A can be part of the lateral clearance indicator 550A or be the lateral clearance indicator 550A as in FIG. 5A. The rear signal light 622A can output a particular output based on a metric generated based on a trajectory of the vehicle 102 and a trajectory of an object. The rear signal light 622A can output a particular output based on the object being within one or more thresholds associated with the vehicle. The rear signal light 622A can output a particular output based on one or more aspects of the trajectory of the vehicle 102 and the trajectory of the object.

The vehicle audiovisual device array 630A can include one or more audiovisual devices. The vehicle 102 can use the vehicle audiovisual device array 630A to output an indication, as discussed herein. The vehicle audiovisual device array 630A can output a visual indication having a brightness, intensity, pattern, and frequency. The vehicle audiovisual device array 630A can output an audio indication having a tone, frequency, pattern, and volume. The vehicle audiovisual device array 630A can be part of the lateral clearance indicator 540A or be the lateral clearance indicator 540A as in FIG. 5A.

The trailer audiovisual device array 640A can include one or more audiovisual devices. The vehicle 102 can use the trailer audiovisual device array 640A to output an indication, as discussed herein. The trailer audiovisual device array 640A can output a visual indication having a brightness, intensity, pattern, and frequency. The trailer audiovisual device array 640A can output an audio indication having a tone, frequency, pattern, and volume. The trailer audiovisual device array 640A can be part of the lateral clearance indicator 550A or be the lateral clearance indicator 550A as in FIG. 5A.

The vehicle 102 can use the headlight 610A, the forward signal light 612A, the taillight 620A, and the rear signal light 622A to output indications, as discussed herein. In this way, the vehicle 102 can output the indications even if the vehicle does not include the vehicle audiovisual device array 630A and the trailer audiovisual device array 640A. In some implementations, the vehicle 102 can use the headlight 610A, the forward signal light 612A, the taillight 620A, and the rear signal light 622A to output a first type of indications and use the vehicle audiovisual device array 630A and the trailer audiovisual device array 640A to output a second type of indications. In some implementations, the vehicle 102 can use the headlight 610A, the forward signal light 612A, the taillight 620A, and the rear signal light 622A to output indications of a first level and use the vehicle audiovisual device array 630A and the trailer audiovisual device array 640A to output a second level of indications. In an example, the vehicle 102 uses the vehicle audiovisual device array 630A and the trailer audiovisual device array 640A to output indications of a first intensity and then adds the headlight 610A, the forward signal light 612A, the taillight 620A, or the rear signal light 622A to increase an intensity of the indication to a second intensity.

Figure 6B:
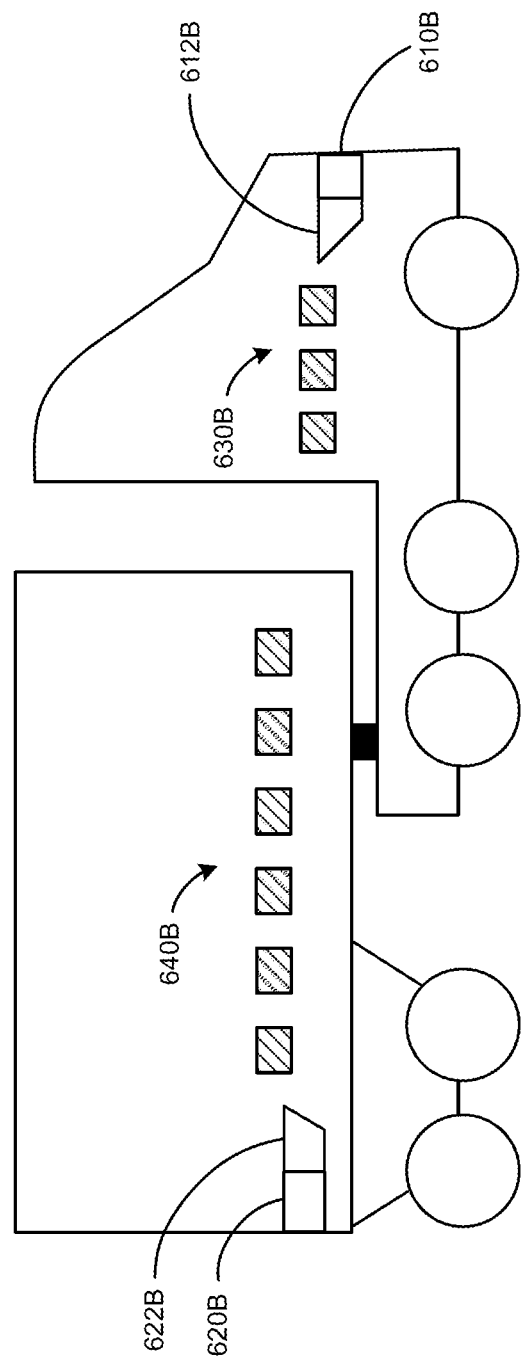
FIG. 6B depicts an example indicator device state, in accordance with present implementations.

FIG. 6B depicts an example indicator device state 600B, in accordance with present implementations. As illustrated by way of example in FIG. 6B, an example indicator device state 600B can include at least a headlight 610B, a forward signal light 612B, a taillight 620B, a rear signal light 622B, an activated vehicle audiovisual device array 630B, and an activated trailer audiovisual device array 640B.

The headlight 610B can be a stock headlight of the vehicle 102. The vehicle 102 can use the headlight 610B to output an indication, as discussed herein. The headlight 610B can output a visual indication having a brightness, intensity, pattern, and frequency. The headlight 610B can be part of the forward clearance indicator 542A or be the forward clearance indicator 542A as in FIG. 5A. The headlight 610B can output a particular output based on a metric generated based on a trajectory of the vehicle 102 and a trajectory of an object. The headlight 610B can output a particular output based on the object being within one or more thresholds associated with the vehicle. The headlight 610B can output a particular output based on one or more aspects of the trajectory of the vehicle 102 and the trajectory of the object.

The forward signal light 612B can be a stock signal light of the vehicle 102. The vehicle 102 can use the forward signal light 612B to output an indication, as discussed herein. The forward signal light 612B can output a visual indication having a brightness, intensity, pattern, and frequency. The forward signal light 612B can be part of the forward clearance indicator 542A or be the forward clearance indicator 542A as in FIG. 5A. The forward signal light 612B can be part of the lateral clearance indicator 540A or be the lateral clearance indicator 540A as in FIG. 5A. The forward signal light 612B can output a particular output based on a metric generated based on a trajectory of the vehicle 102 and a trajectory of an object. The forward signal light 612B can output a particular output based on the object being within one or more thresholds associated with the vehicle. The forward signal light 612B can output a particular output based on one or more aspects of the trajectory of the vehicle 102 and the trajectory of the object.

The taillight 620B can be a stock taillight of the vehicle 102. The vehicle 102 can use the taillight 620B to output an indication, as discussed herein. The taillight 620B can output a visual indication having a brightness, intensity, pattern, and frequency. The taillight 620B can be part of the rear clearance indicator 552A or be the rear clearance indicator 552A as in FIG. 5A. The taillight 620B can output a particular output based on a metric generated based on a trajectory of the vehicle 102 and a trajectory of an object. The taillight 620B can output a particular output based on the object being within one or more thresholds associated with the vehicle. The taillight 620B can output a particular output based on one or more aspects of the trajectory of the vehicle 102 and the trajectory of the object.

The rear signal light 622B can be a stock rear signal light of the vehicle 102. The vehicle 102 can use the rear signal light 622B to output an indication, as discussed herein. The rear signal light 622B can output a visual indication having a brightness, intensity, pattern, and frequency. The rear signal light 622B can be part of the rear clearance indicator 552A or be the rear clearance indicator 552A as in FIG. 5A. The rear signal light 622B can be part of the lateral clearance indicator 550A or be the lateral clearance indicator 550A as in FIG. 5A. The rear signal light 622B can output a particular output based on a metric generated based on a trajectory of the vehicle 102 and a trajectory of an object. The rear signal light 622B can output a particular output based on the object being within one or more thresholds associated with the vehicle. The rear signal light 622B can output a particular output based on one or more aspects of the trajectory of the vehicle 102 and the trajectory of the object.

The activated vehicle audiovisual device array 630B can include one or more audiovisual devices. The vehicle 102 can use the activated vehicle audiovisual device array 630B to output an indication, as discussed herein. The activated vehicle audiovisual device array 630B can output a visual indication having a brightness, intensity, pattern, and frequency. The activated vehicle audiovisual device array 630B can output an audio indication having a tone, frequency, pattern, and volume. The activated vehicle audiovisual device array 630B can be part of the lateral clearance indicator 540A or be the lateral clearance indicator 540A as in FIG. 5A.

One or more of the one or more audiovisual devices of the activated vehicle audiovisual device array 630B can output the indication. In an example, one audiovisual device of the activated vehicle audiovisual device array 630B outputs the indication. In another example, multiple audiovisual devices of the activated vehicle audiovisual device array 630B each output the indication. In another example, multiple audiovisual devices of the activated vehicle audiovisual device array 630B each output the indication in a coordinated manner. In another example, multiple audiovisual devices of the activated vehicle audiovisual device array 630B coordinate to output the indication. Individual audiovisual devices of the activated vehicle audiovisual device array 630B can be activated to output the indication based on the metric and/or the one or more thresholds.

The activated trailer audiovisual device array 640B can include one or more audiovisual devices. The vehicle 102 can use the activated trailer audiovisual device array 640B to output an indication, as discussed herein. The activated trailer audiovisual device array 640B can output a visual indication having a brightness, intensity, pattern, and frequency. The activated trailer audiovisual device array 640B can output an audio indication having a tone, frequency, pattern, and volume. The activated trailer audiovisual device array 640B can be part of the lateral clearance indicator 550A or be the lateral clearance indicator 550A as in FIG. 5A.

The vehicle 102 can use the activated vehicle audiovisual device array 630B and/or the activated trailer audiovisual device array 640B to output indications. The vehicle can use the headlight 610B, the forward signal light 612B, the taillight 620B, the rear signal light 622B for their conventional use and not to output indications.

Figure 6C:
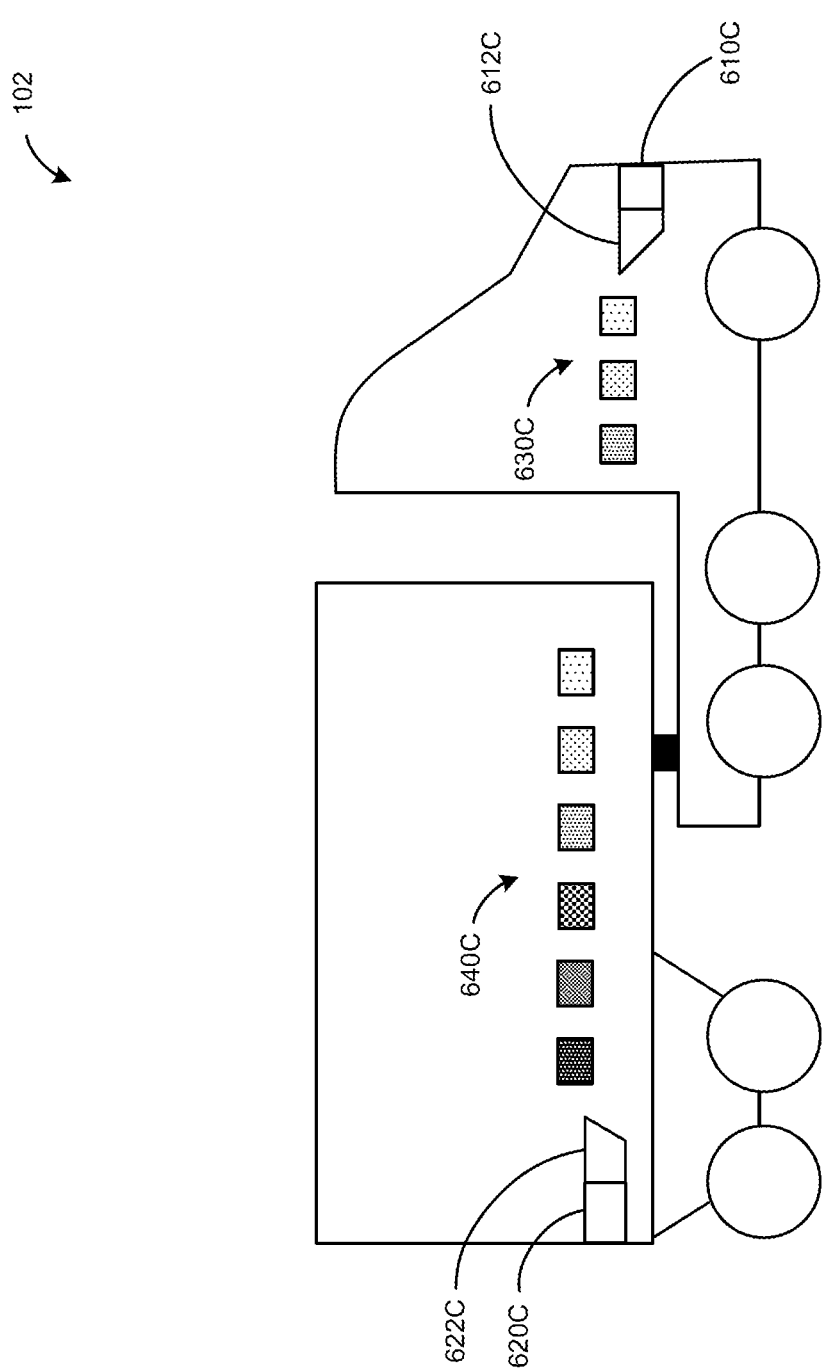
FIG. 6C depicts an example indicator device state, in accordance with present implementations.

FIG. 6C depicts an example indicator device state 600C, in accordance with present implementations. As illustrated by way of example in FIG. 6C, an example indicator device state 600C can include at least a gradient-activated vehicle audiovisual device array 630C, and a gradient-activated trailer audiovisual device array 640C.

The gradient-activated vehicle audiovisual device array 630C can include one or more audiovisual devices. The vehicle 102 can use the gradient-activated vehicle audiovisual device array 630C to output an indication, as discussed herein. The gradient-activated vehicle audiovisual device array 630C can be part of the lateral clearance indicator 540A or be the lateral clearance indicator 540A as in FIG. 5A. The gradient-activated vehicle audiovisual device array 630C can output an audiovisual indication having a brightness, intensity, pattern, frequency, tone, pattern, and volume. The indication can have a first gradient. The first gradient can be based on a metric generated based on a trajectory of the vehicle and a trajectory of an external object, such as an external vehicle. In an example, the first gradient is based on a location of an external vehicle, where the first gradient changes in color, brightness, and volume based on distance from the external vehicle. The first gradient can be modified based on a velocity of the external vehicle, such that the first gradient is tighter when the external vehicle is closer and such that the first gradient is looser when the external vehicle is farther away.

The gradient-activated trailer audiovisual device array 640C can include one or more audiovisual devices. The vehicle 102 can use the gradient-activated trailer audiovisual device array 640C to output a second indication, as discussed herein. The gradient-activated trailer audiovisual device array 640C can be part of the lateral clearance indicator 550A or be the lateral clearance indicator 550A as in FIG. 5A. The gradient-activated trailer audiovisual device array 640C can output an audiovisual indication having a brightness, intensity, pattern, frequency, tone, pattern, and volume. The indication can have a second gradient. The second gradient can be based on a metric generated based on a trajectory of the vehicle and a trajectory of an external object, such as an external vehicle. In an example, the second gradient is based on a location of an external vehicle, where the second gradient changes in color, brightness, and volume based on distance from the external vehicle. The second gradient can be modified based on a velocity of the external vehicle, such that the second gradient is tighter when the external vehicle is closer and such that the second gradient is looser when the external vehicle is farther away.

A third gradient can extend across the gradient-activated vehicle audiovisual device array 630C and the gradient-activated trailer audiovisual device array 640C. In some implementations, a headlight 610C, a front signal light 612C, a rear signal light 622C, and/or a taillight 620C of the vehicle 102 can be part of the first, second, or third gradient. The vehicle 102 can output indications from the gradient-activated vehicle audiovisual device array 630C having the first gradient and indications form the gradient-activated trailer audiovisual device array 640C having the second gradient. The vehicle 102 can output indications from the gradient-activated vehicle audiovisual device array 630C and indications form the gradient-activated trailer audiovisual device array 640C to form the third gradient.

One or more of the one or more audiovisual devices of the gradient-activated vehicle audiovisual device array 630C can output the indication. In an example, one audiovisual device of the gradient-activated vehicle audiovisual device array 630C outputs the indication. In another example, multiple audiovisual devices of the gradient-activated vehicle audiovisual device array 630C each output the indication. In another example, multiple audiovisual devices of the gradient-activated vehicle audiovisual device array 630C each output the indication in a coordinated manner. In another example, multiple audiovisual devices of the gradient-activated vehicle audiovisual device array 630C coordinate to output the indication. Individual audiovisual devices of the gradient-activated vehicle audiovisual device array 630C can be activated to output the indication based on the metric and/or the one or more thresholds. The gradient can extend across the gradient-activated vehicle audiovisual device array 630C, a portion of the gradient-activated vehicle audiovisual device array 630C, or a single audiovisual device.

Figure 7:
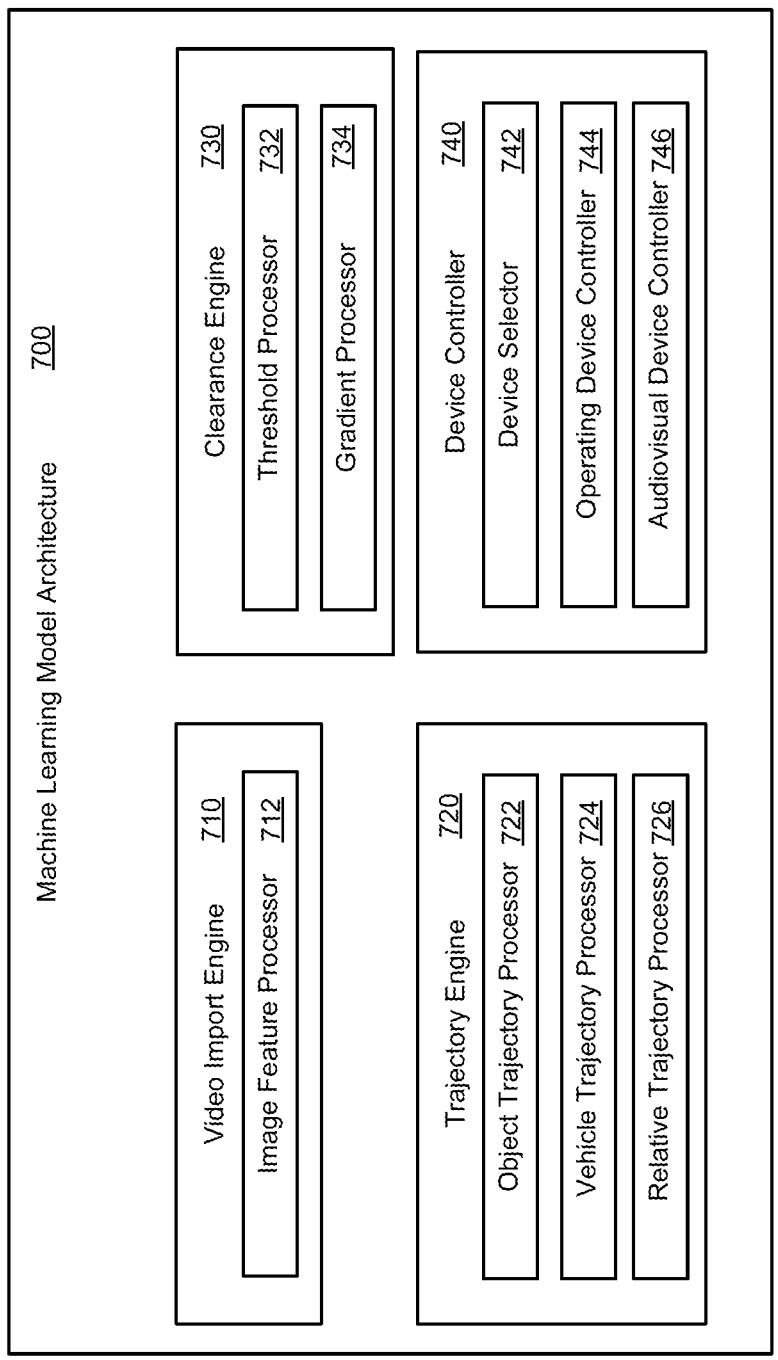
FIG. 7 depicts an example machine learning model architecture, in accordance with present implementations.

FIG. 7 depicts an example machine learning model architecture 700, in accordance with present implementations. As illustrated by way of example in FIG. 7, the example machine learning model architecture 700 can include at least a video import engine 710, a trajectory engine 720, a clearance engine 730, and a device controller 740.

The video import engine 710 can receive video from one or more sensors of a vehicle. The one or more sensors can include cameras, Light Detection and Ranging (LIDAR) sensors, radar, infrared sensors, or other sensors. The video import engine 710 can convert the received video into a format for use by the machine learning model architecture 700. The video import engine 710 can include an image feature processor 712.

The image feature processor 712 can identify features of the video. For example, the image feature processor 712 can identify features such as a road surface, road markings, road signs, external vehicles, pedestrians, buildings, weather, time of day, curbs, traffic cones, and/or other features. The image features processor 712 can track the features across frames of the video.

The trajectory engine 720 can determine trajectories for the vehicle, for external objects, and relative trajectories based on the video from the video import engine 710 and/or the video features identified by the image features processor 712. The trajectory engine 720 can include an object trajectory processor 722, a vehicle trajectory processor 724, and a relative trajectory processor 726.

The object trajectory processor 722 can determine a trajectory of an external object, such as a vehicle based on the video from the video import engine 710 and/or the video features identified by the image features processor 712. The object trajectory processor 722 can determine a position, velocity, acceleration, and/or jerk of the external object. The object trajectory processor 722 can determine the trajectory of the external object relative to the vehicle and/or relative to the road surface.

The vehicle trajectory processor 724 can determine a trajectory of the vehicle based on the video from the video import engine 710, the video features identified by the image features processor 712. The vehicle trajectory processor 724 can determine the trajectory of the vehicle based on vehicle information, such as a vehicle speed as measured by a speedometer of the vehicle, GPS coordinates of the vehicle, and/or inertial measurements of the vehicle. The vehicle trajectory processor 724 can determine a trajectory of the vehicle relative to the road surface, relative to an external object, and/or relative to a prevailing flow of traffic.

The relative trajectory processor 726 can determine a trajectory of an object relative to the vehicle based on the object trajectory determined by the object trajectory processor 722 and the vehicle trajectory determined by the vehicle trajectory processor 724. The relative trajectory processor 726 can determine a trajectory of an object relative to the road surface based on the object trajectory determined by the object trajectory processor 722 and the vehicle trajectory determined by the vehicle trajectory processor 724. In an example, the relative trajectory processor 726 converts an object trajectory relative to the vehicle to an object trajectory relative to the road surface.

The clearance engine 730 can determine a clearance between the object and the vehicle. The clearance engine 730 can include a threshold processor 732, and a gradient processor 734. The threshold processor 732 can determine whether the object is within one or more thresholds, such as the event threshold 532 and the contact threshold 530 of FIG. 5A based on the object trajectory relative to the vehicle. The threshold processor 732 can determine whether the object will enter the one or more thresholds based on the object trajectory relative to the vehicle. In some implementations, the threshold processor 732 can adjust the one or more thresholds based on the object trajectory relative to the vehicle and/or the object trajectory relative to the road surface. The gradient processor 734 can determine a location of the object within a gradient of a threshold. In an example, the gradient processor 734 determines that the object is halfway between an external edge and an internal edge of the event threshold. The gradient processor 734 can determine a velocity, acceleration, and/or jerk of the object within the gradient of the threshold.

The clearance engine 730 can generate a metric based on the output of the threshold processor 732 and/or the gradient processor 734. The metric can be based on a position, velocity, acceleration, and/or jerk of the object within the threshold and/or gradient of the threshold.

The device controller 740 can control one or more devices for outputting indications, as discussed herein. The device controller 740 can include a device selector 742, an operating device controller 744, and an audiovisual device controller 746.

The device selector 742 can select one or more device systems for outputting an indication. In an example, the device selector 742 selects headlights and taillights of the vehicle for outputting the indication. In another example, the device selector 742 selects one or more audiovisual device arrays for outputting the indication. A device array can include multiple audiovisual devices which output the indication individually or severally, independently, or in a coordinated manner. The device selector 742 can select the one or more device systems based on an availability of the one or more device systems, a type of the indication, an intensity of the indication, and/or a location of the object.

The operating device controller 744 can select one or more devices within the selected device system. In an example, the operating device controller 744 selects a lateral clearance indicator from one or more audiovisual device arrays. The operation device controller 744 can select the one or more devices based on an object trajectory, a field of view including the object, and/or the indication to be output, as discussed herein. In an example, the operating device controller 744 selects a rear clearance indicator and a left lateral indicator based on a vehicle being within a rear-left field of view of the vehicle.

The audiovisual device controller 746 can control the selected one or more devices to output the indication. The audiovisual device controller 746 can determine the indication based on the metric generated by the clearance ending. The audiovisual device controller 746 can generate the metric based on a threshold value and/or gradient value from the clearance engine 730. The indication can include a volume, tone, pitch, frequency, pattern, intensity, brightness, color, and/or gradient, as discussed herein.

Figure 8:
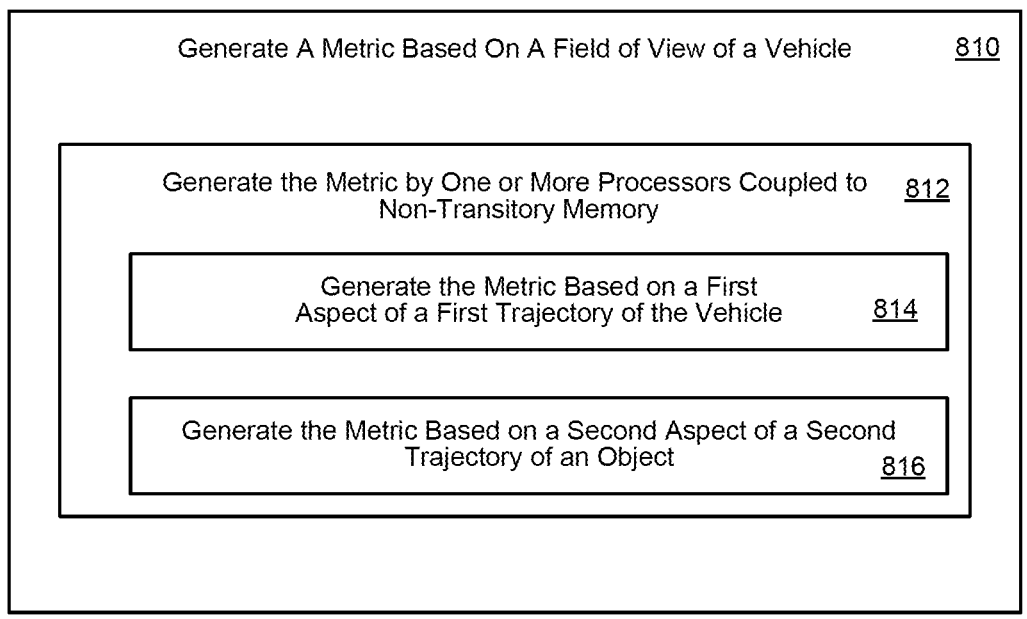
FIG. 8 depicts an example method of generating a metric based on a field of view of a vehicle, in accordance with present implementations.

FIG. 8 depicts an example method 800 of generating a metric based on a field of view of a vehicle, in accordance with present implementations. At least the vehicle 102 of FIGS. 5A-6C and the machine learning model architecture 700 of FIG. 7 can perform the method 800.

At 810, a metric is generated based on a field of view of the vehicle using one or more processors coupled to non-transitory memory. The metric can be generated by a single processor, by multiple processors working in parallel, and/or by multiple processors working in sequence. The one or more processors can generate the metric based on an object being in the field of the view of the vehicle.

At 812, the metric is generated by the one or more processors coupled to non-transitory memory. At 814, the metric is generated based on a first aspect of a first trajectory of a vehicle. At 816, the metric is generated based on a second aspect of a second trajectory of an object. The metric can include a scalar value of a gradient at one or more bounds of a range of an output of an audiovisual device. The indication can have a property corresponding to the scalar value.

The method 800 can include determining, by the one or more processors, that the metric satisfies a threshold indicating a type of clearance between the object and the vehicle, the property based on the type of clearance between the object and the vehicle. The type of clearance can be based on at least one of a distance between the vehicle and the object, a relative velocity between the vehicle and the object, or a relative acceleration between the vehicle and the object.

The method 800 can include determining, by the one or more processors, that the metric satisfies a threshold indicating a type of movement of the object, the property based on the type of movement of the object. The type of movement can be based on at least one of a velocity of the object, an acceleration of the object, or a jerk of the object.

Figure 9:
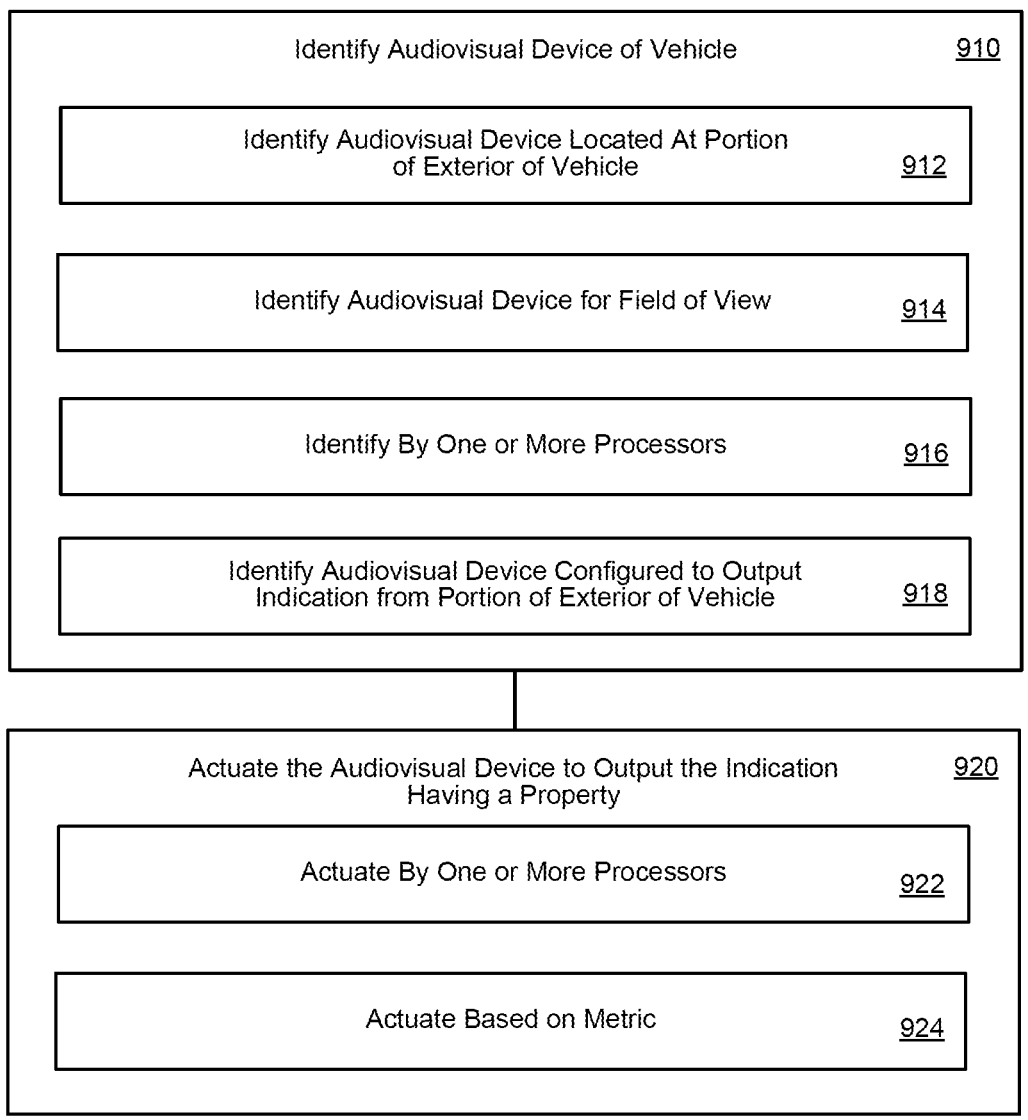
FIG. 9 depicts an example method of outputting a vehicle proximity indication, in accordance with present implementations.

FIG. 9 depicts an example method 900 of outputting a vehicle proximity indication, in accordance with present implementations. At least the vehicle 102 of FIGS. 5A-6C and the machine learning model architecture 700 of FIG. 7 can perform the method 900. The method 900 can follow the method 800 of FIG. 8.

At 910, an audiovisual device of the vehicle is identified. Multiple audiovisual devices can be identified at 910. At 912, the method 900 can identify an audiovisual device located at a portion of an exterior of the vehicle. The audiovisual device can be identified based on an availability of the audiovisual device. The audiovisual device can be identified based on a trajectory of an object. At 914, the audiovisual device can be identified for a field of view. The audiovisual device can be identified based on the object being in the field of view or based on the object having a trajectory which will take the object into the field of view. At 916, is identified by one or more processors. The audiovisual device can be identified by a single processor, by multiple processors working in parallel, and/or by multiple processors working in sequence. At 918, the audiovisual device is identified based on the audiovisual device being configured to output the indication from the portion of the exterior of the vehicle. The audiovisual device can be configured to generate a light emission and can be located at the portion of the exterior of the vehicle corresponding to the field of view, the indication corresponding to the light emission. The property of the light emission can have at least one of a brightness or a color corresponding to the metric. The audiovisual device can be configured to generate a sound and can be located at the portion of the exterior of the vehicle corresponding to the field of view, the indication corresponding to the sound. The property of the light emission can have at least one of a volume or a tone corresponding to the metric.

At 920, the audiovisual device can be actuated to output the indication having a property. The property can be based on a trajectory of the object and/or a trajectory of the vehicle, as discussed herein. The property can include a volume, pitch, tone, modulation, frequency, intensity, brightness, pattern, or color of the indication. At 922, the one or more processors can actuate the audiovisual device. At 924, the audiovisual device can be actuated based on a metric, such as the metric discussed in conjunction with FIG. 8. The metric can include a scalar value of a gradient at one or more bounds of a range of an output of the audiovisual device. The indication can have the property corresponding to the scalar value. In an example, the bounds of a range of an output of a speaker are the maximum and minimum value. The gradient can include a linear gradient between the bounds of the range of the output of the audiovisual device. The gradient can include a non-linear gradient between the bounds of the range of the output of the audiovisual device. In some implementations, the gradient can be linear according to a first measure and non-linear according to a second measure. In an example, the gradient is linear as to intensity and non-linear as to voltage. In an example, the property can be medium volume and the scalar value can be fifty for volume where the audiovisual device has a volume range from zero to one hundred.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A method, comprising:
    generating, by a machine learning model executable by one or more processors of a vehicle coupled to non-transitory memory of the vehicle, a metric based on one or more first aspects of a first trajectory of the vehicle and one or more second aspects of a second trajectory of an object in a field of view of the vehicle, the metric indicating proximity of the object with the vehicle, wherein generating the metric further comprises:
        generating the metric by comparing the one or more first aspects and the one or more second aspects with one or more thresholds;
    identifying, by the machine learning model, an audiovisual device of the vehicle located at a portion of an exterior of the vehicle corresponding to the field of view, the audiovisual device configured to output an indication from the portion of the exterior of the vehicle; and
    actuating, by the machine learning model, the audiovisual device to output the indication having a property based on the metric.

2. The method of claim 1, further comprising:
    determining, by the one or more processors, that the metric satisfies a threshold indicating a type of clearance between the object and the vehicle, the property based on the type of clearance between the object and the vehicle.

3. The method of claim 2, the type of clearance based on at least one of a distance between the vehicle and the object, a relative velocity between the vehicle and the object, or a relative acceleration between the vehicle and the object.

4. The method of claim 1, further comprising:
    determining, by the one or more processors, that the metric satisfies a threshold indicating a type of movement of the object, the property based on the type of movement of the object.

5. The method of claim 4, the type of movement based on at least one of a velocity of the object, an acceleration of the object, or a jerk of the object.

6. The method of claim 1, the metric comprising a scalar value of a gradient at one or more bounds of a range of the output of the audiovisual device, and the indication having the property corresponding to the scalar value.

7. The method of claim 1, the audiovisual device configured to generate a light emission and located at the portion of the exterior of the vehicle corresponding to the field of view, the indication corresponding to the light emission.

8. The method of claim 7, the property of the light emission having at least one of a brightness or a color corresponding to the metric.

9. The method of claim 1, the audiovisual device configured to generate a sound located at the portion of the exterior of the vehicle corresponding to the field of view, the indication corresponding to the sound.

10. The method of claim 9, the property of the sound having at least one of a volume or a tone corresponding to the metric.

11. A system, comprising:
    one or more processors of a vehicle coupled to non-transitory memory of the vehicle, and an audiovisual device, the one or more processors configured to:

generate, by a machine learning model executable by the one or more processor, a metric based on one or more first aspects of a first trajectory of the vehicle and one or more second aspects of a second trajectory of an object in a field of view of the vehicle, the metric indicating proximity of the object with the vehicle, wherein generate the metric further comprises:
  generate the metric by comparing the one or more first aspects and the one or more second aspects with one or more thresholds;
identify, by the machine learning model, the audiovisual device of the vehicle located at a portion of an exterior of the vehicle corresponding to the field of view, the audiovisual device configured to output an indication from the portion of the exterior of the vehicle; and
actuate, by the machine learning model, the audiovisual device to output the indication having a property based on the metric.

12. The system of claim 11, the processors further configured to:
  determine that the metric satisfies a threshold indicating a type of clearance between the object and the vehicle, the property based on the type of clearance between the object and the vehicle.

13. The system of claim 12, the type of clearance based on at least one of a distance between the vehicle and the object, a relative velocity between the vehicle and the object, or a relative acceleration between the vehicle and the object.

14. The system of claim 11, the processors further configured to:
  determine that the metric satisfies a threshold indicating a type of movement of the object, the property based on the type of movement of the object.

15. The system of claim 14, the type of movement based on at least one of a velocity of the object, an acceleration of the object, or a jerk of the object.

16. The system of claim 11, the metric comprising a scalar value of a gradient at one or more bounds of a range of the output of the audiovisual device, and the indication having the property corresponding to the scalar value.

17. The system of claim 11, the audiovisual device configured to generate a light emission and located at the portion of the exterior of the vehicle corresponding to the field of view, the indication corresponding to the light emission.

18. The system of claim 17, the property of the light emission having at least one of a brightness or a color corresponding to the metric.

19. The system of claim 11, the audiovisual device configured to generate a sound and located at the portion of the exterior of the vehicle corresponding to the field of view, the indication corresponding to the sound, and the property of the sound having at least one of a volume or a tone corresponding to the metric.

20. A non-transitory computer readable medium including one or more instructions stored thereon and executable by a processor to:
  generate, by a machine learning model executable by a processor of a vehicle, a metric based on one or more first aspects of a first trajectory of the vehicle and one or more second aspects of a second trajectory of an object in a field of view of the vehicle, the metric indicating proximity of the object with the vehicle, wherein generate the metric further comprises:
    generate the metric by comparing the one or more first aspects and the one or more second aspects with one or more thresholds;
  identify, by the machine learning model, the audiovisual device of the vehicle located at a portion of an exterior of the vehicle corresponding to the field of view, a audiovisual device configured to output an indication from the portion of the exterior of the vehicle; and
  actuate, by the machine learning model, the audiovisual device to output the indication having a property based on the metric.

* * * * *